US007610138B2

(12) United States Patent
Takagi et al.

(10) Patent No.: US 7,610,138 B2
(45) Date of Patent: Oct. 27, 2009

(54) VEHICLE INFORMATION PROCESSING SYSTEM AND METHOD

(75) Inventors: Toru Takagi, Cambridge, MA (US); Susumu Fujita, Yokohama (JP); Masao Yamane, Yokosuka (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 824 days.

(21) Appl. No.: 11/338,718

(22) Filed: Jan. 25, 2006

(65) Prior Publication Data

US 2006/0173611 A1 Aug. 3, 2006

(30) Foreign Application Priority Data

Jan. 28, 2005 (JP) ............................. 2005-021693

(51) Int. Cl.
*G01C 21/00* (2006.01)
*G08C 1/0969* (2006.01)

(52) U.S. Cl. ........................... 701/96; 701/204; 701/117

(58) Field of Classification Search .................... 701/96, 701/117, 301, 204, 205, 211; 340/905, 903, 340/435, 436, 902, 932, 995.13; 434/29
See application file for complete search history.

(56) References Cited

U.S. PATENT DOCUMENTS 6,249,232 B1 * 6/2001 Tamura et al. .............. 340/902
6,679,702 B1 * 1/2004 Rau ............................. 434/29
2002/0198660 A1 * 12/2002 Lutter et al. ................ 701/301
2005/0088318 A1 * 4/2005 Liu et al. .................... 340/902
2005/0099321 A1 * 5/2005 Pearce .................... 340/995.13

FOREIGN PATENT DOCUMENTS

JP 2001-317953 A 11/2001

* cited by examiner

*Primary Examiner*—Tan Q Nguyen
(74) *Attorney, Agent, or Firm*—Foley & Lardner LLP

(57) ABSTRACT

A vehicle information processing system 100 conducts wireless communications between a preceding vehicle 200 and a succeeding vehicle 201, and exhibits information on a winker operation of the preceding vehicle 200 to a driver of the succeeding vehicle 201, and includes vehicle-mounted apparatuses 1 in the preceding and succeeding vehicles, of which one 1 in the preceding vehicle 200 wirelessly transmits information on a winker operation of the preceding vehicle, and the other 1 in the succeed vehicle 201 receives the wirelessly transmitted information on the winker state, and exhibits same to a driver of the succeeding vehicle 201, while the apparatus 1 in the succeeding vehicle 201 estimates a relationship between the preceding vehicle 200 and the succeeding vehicle 201, judges whether an exhibition liming of the information on the winker state is to be hastened or delayed based on an estimation result, and exhibits the information on the winker state at the judged timing.

20 Claims, 24 Drawing Sheets

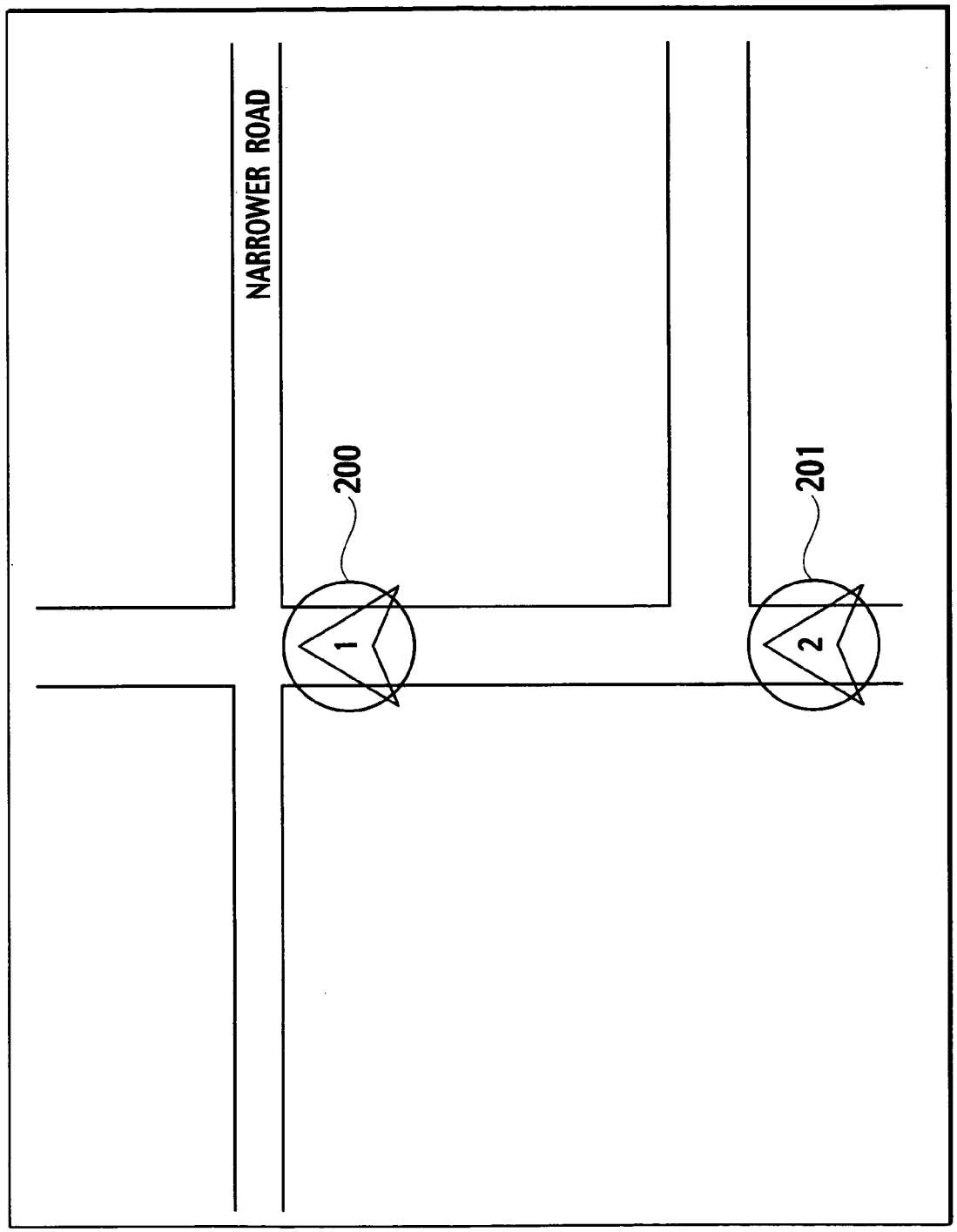

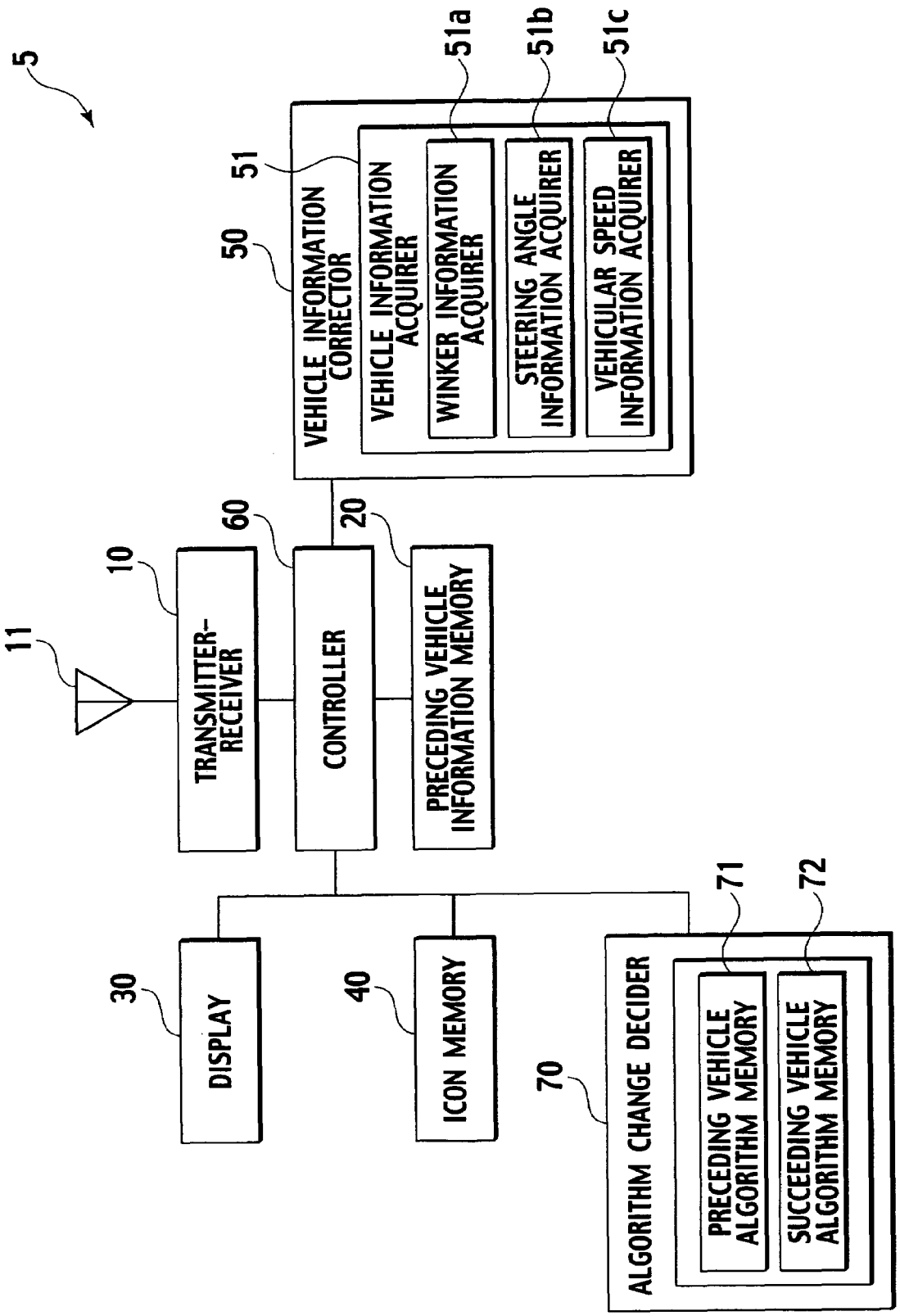

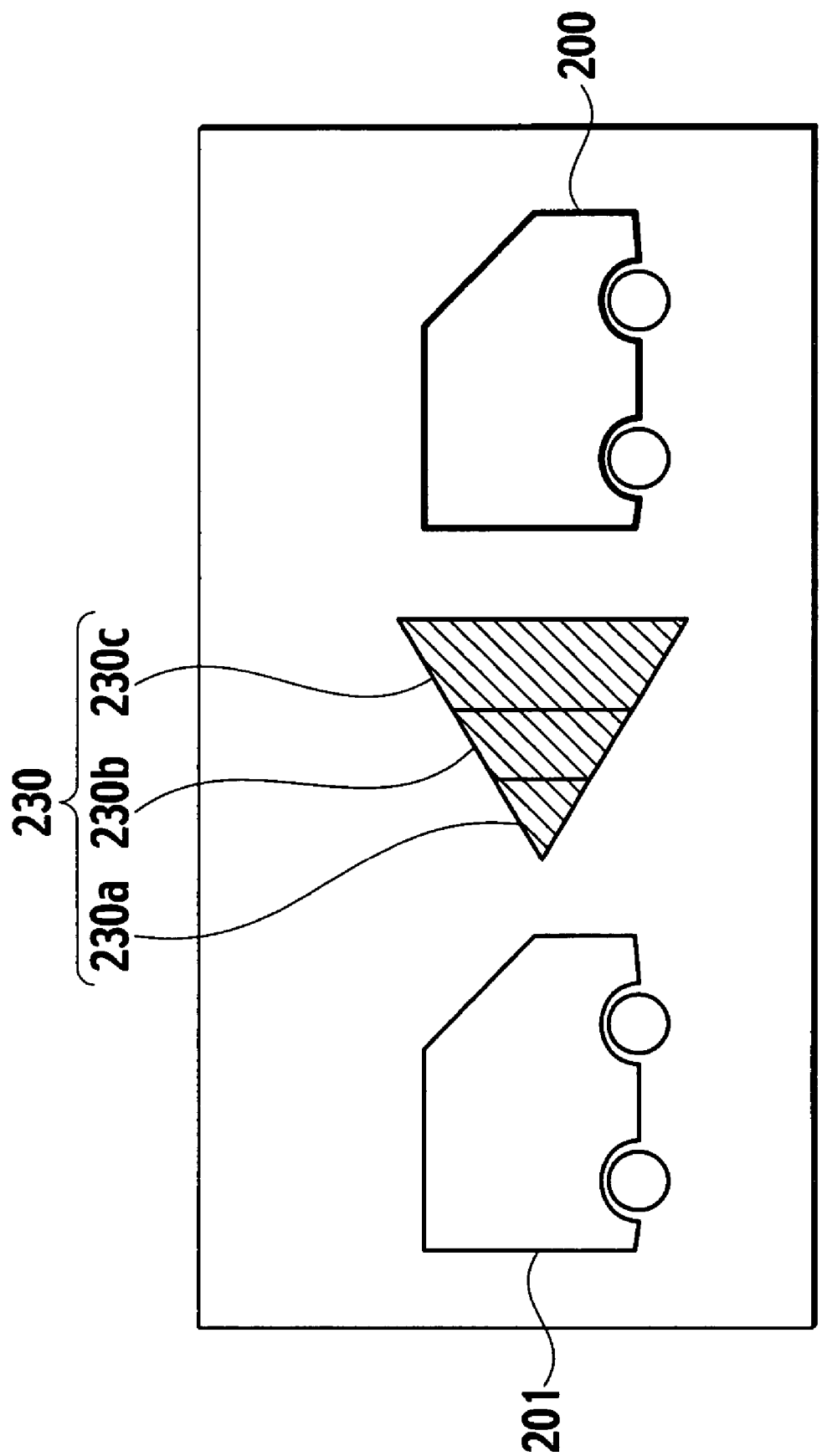

US 7,610,138 B2

VEHICLE INFORMATION PROCESSING SYSTEM AND METHOD

BACKGROUND OF THE INVENTION

The present invention relates to a vehicle information processing system for, and a vehicle information processing method of, processing information on a vehicle.

A plurality of vehicles may sometimes perform a group run toward a destination.

For a smooth group run of vehicles, a navigator is disclosed in Japanese Patent Application Laid Open Publication No. 2001-317953, in which a driver of a "foremost vehicle" (hereinafter called "preceding vehicle") inputs a destination, so that a recommendable path toward the destination is calculated, and information on the recommendable path is transmitted to "another vehicle following the preceding vehicle" (hereinafter called "succeeding vehicle").

SUMMARY OF THE INVENTION

It has however been sometimes difficult for such a navigator to suitably conduct vehicles in a group run.

The present invention has been made in view of the foregoing points. It is therefore an object of the present invention to provide a vehicle information processing system, and a vehicle information processing method, allowing for a decreased frequency of failure in group run.

To achieve the object according to an aspect of the invention, a vehicle information processing system configured to process information on a vehicle, comprises an estimator configured to estimate a running-related relationship between a first vehicle and a second vehicle, and a timing decider configured to decide, depending on a result of an estimation by the estimator, an exhibition timing at which information on a winker state of the first vehicle is exhibited to a driver of the second vehicle.

To achieve the object according to another aspect of the invention, a vehicle information processing method of processing information on a vehicle, comprises estimating a running-related relationship between a first vehicle and a second vehicle, and deciding an exhibition timing of information on a winker state of the first vehicle, depending on an estimation result.

BRIEF DESCRIPTION OF THE ACCOMPANYING DRAWINGS

The above and further objects, features, and advantages of the present invention will more fully appear from the detailed description of the preferred modes of embodiment, when the same is read in conjunction with the accompanying drawings, in which:

FIG. 22 is a schematic view of an operation of a vehicle information processing system 100 according to the fourth mode of embodiment;

FIG. 23 is a constitutional view of a vehicle-mounted apparatus 5 according to a fifth mode of embodiment; and FIG. 24 is an explanatory view of an operation of a vehicle information processing system 100 according to the fifth mode of embodiment

DETAILED DESCRIPTION OF THE PREFERRED EMBODIMENTS

Figure 1:
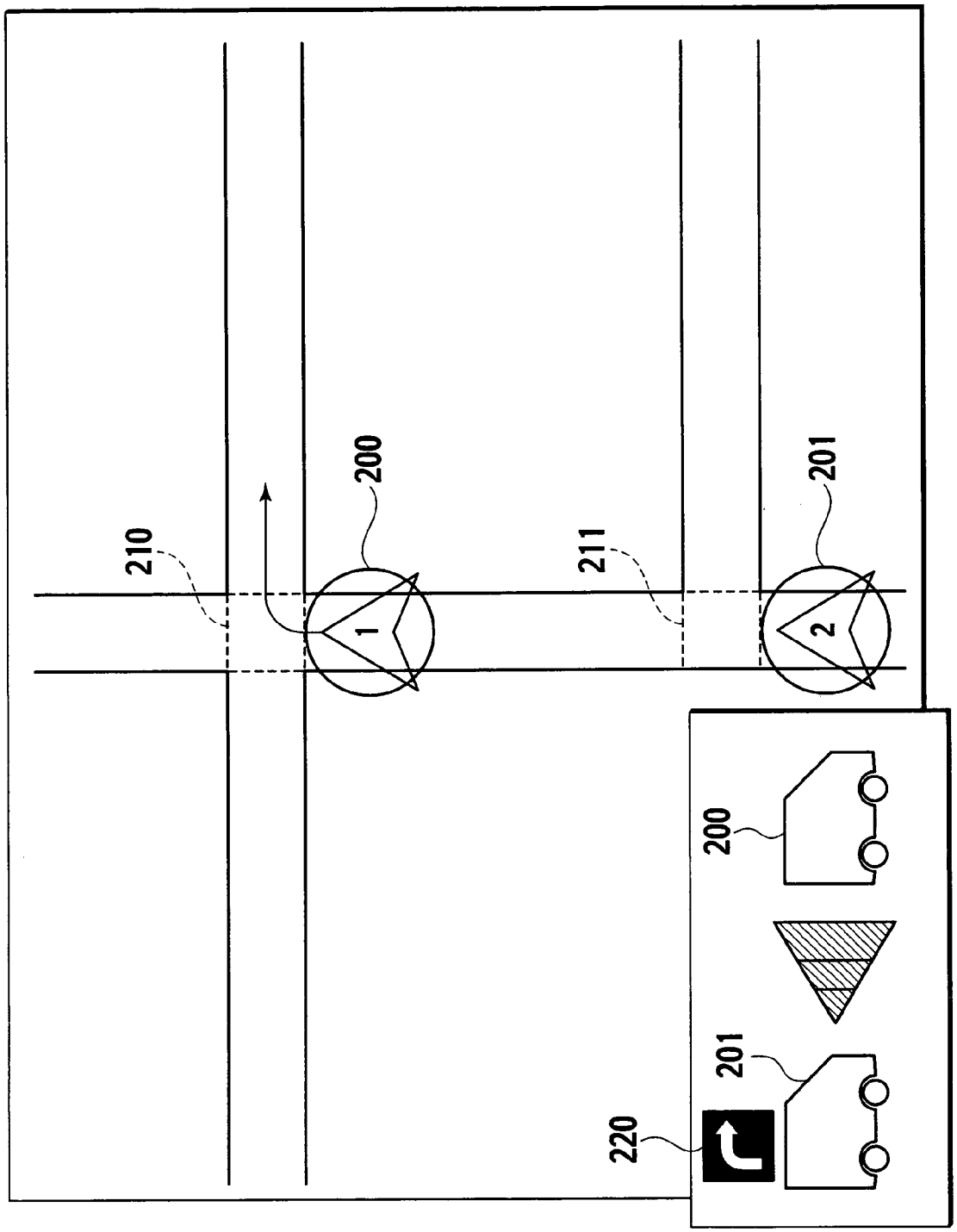
FIG. 1 is a view of the related art showing information on a winker state of a preceding vehicle, and an exhibition timing therefor.

There will be described preferred modes of embodiment of the present invention into details, with reference to the accompanying drawings. Like members or elements are designated by like reference characters.

Before explaining a vehicle information processing system, there will be firstly explained circumstances where the present inventors have resultingly invented the preset invention. FIG. 1 is a view of the related art showing information on a winker state of a preceding vehicle, and an exhibition timing therefor. In FIG. 1, there will be exemplarily explained a situation where information on a winker state is directly and wirelessly transmitted from a preceding vehicle 200 to a succeeding vehicle 201, and exhibited to a driver of the succeeding vehicle 201.

As shown in FIG. 1, it is supposed that the succeeding vehicle 201 is following the preceding vehicle 200, and the preceding vehicle 200 has tuned to the right at an intersection 210. Upon turning to the right, information on a winker state of the preceding vehicle 200 is transmitted therefrom to the succeeding vehicle 201. In the succeeding vehicle 201, information 220 on the winker state is exhibited to a driver thereof to encourage him/her to turn to the right.

However, if the winker state information 220 is exhibited before the succeeding vehicle 201 approaches another intersection 211 preceding to the intersection 210, the driver of the succeeding vehicle 201 may erroneously understand that he/she has to turn to the right at the preceding intersection 211, thereby bringing about a possibility that the succeeding vehicle 201 fails to follow the preceding vehicle 200. Particularly, when the succeeding vehicle 201 is incapable of displaying a detailed map and is merely capable of exhibiting the winker state information 220 in a simpler manner, such erroneous understanding tends to be caused to further increase a possibility of failure of group run.

Under such circumstances, the present inventors have resultingly invented vehicle information processing systems of the following modes of embodiment. Such a vehicle information processing system of each mode of embodiment will be described hereinafter.

Note that the winker state information 220 is information for encouraging a winker operation, and of course embraces a right-turn mark shown in FIG. 1 for encouraging a right turn, as well as information for encouraging a traffic lane change and/or a left turn.

There will be explained preferred modes of embodiment of the present invention. Note that the following modes of embodiment will be each explained in an exemplary situation where winker state information 220 is directly and wirelessly transmitted from a preceding vehicle 200 to a succeeding vehicle 201. However, the present invention is not limited thereto, and winker state information 220 may be wirelessly transmitted from the preceding vehicle 200 to the succeeding vehicle 201 via information center serving as an information relay point Further, it is possible according to the present invention that the winker state information 220 is transmitted from the succeeding vehicle 201 to the preceding vehicle 200, and that information are transmitted and received among two or more vehicles which are simply running side by side without a concept of a preceding vehicle 200 and a succeeding vehicle 201.

Figure 2:
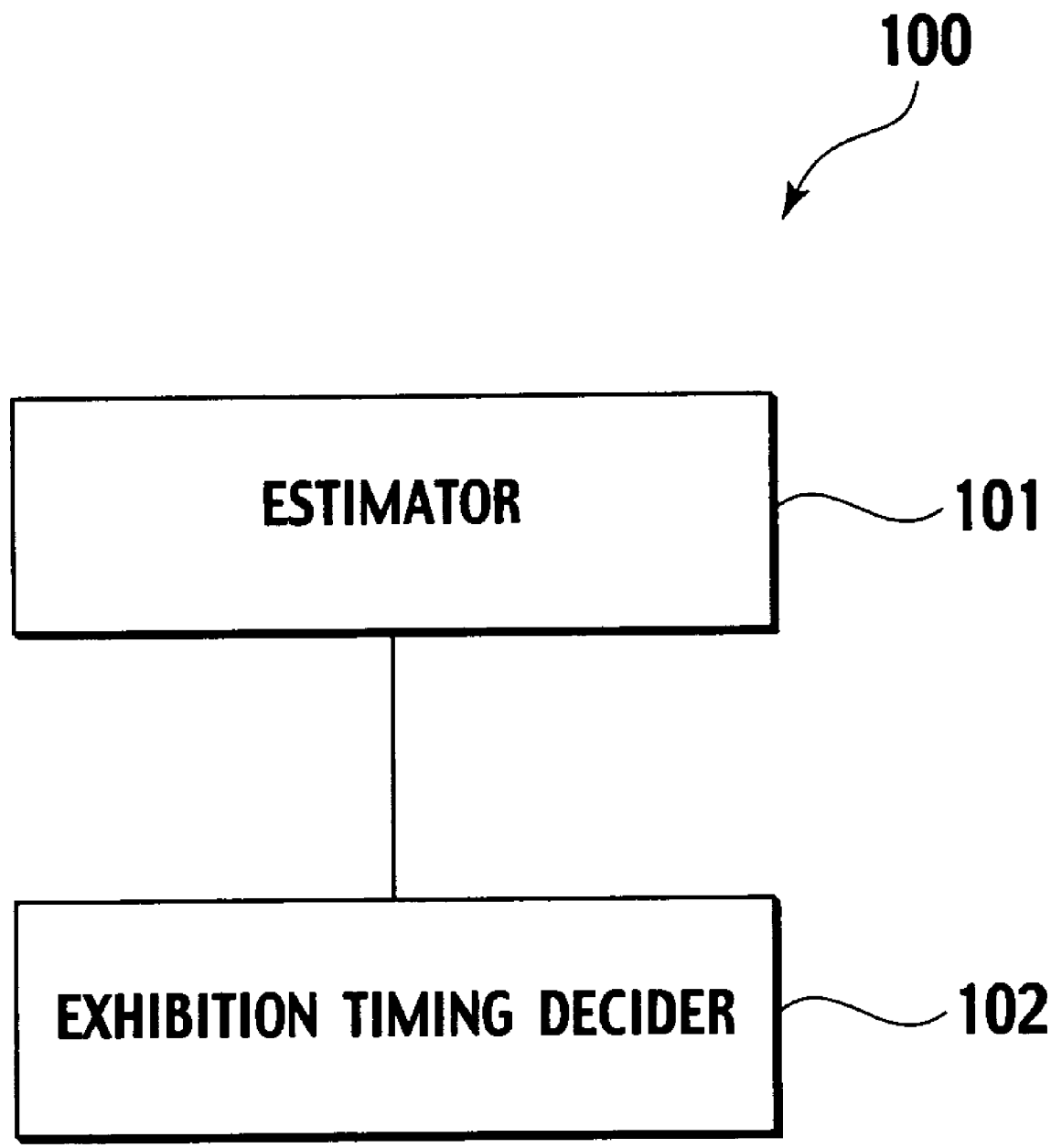
FIG. 2 is a constitutional view of a vehicle information processing system according to a mode of embodiment of the present invention.

FIG. 2 is a constitutional view of a vehicle information processing system 100 according to a mode of embodiment of the present invention. As shown in this figure, the vehicle information processing system 100 includes an estimator 101 and a timing decider 102. The estimator 101 estimates a running-related relationship between a first vehicle 200 and a second vehicle 201. The running-related relationship embraces a distance, a relative speed, and the like between the vehicles. The timing decider 102 exhibits winker state information on the first vehicle 200 to a driver of the second vehicle 201, depending on a result of an estimation by the estimator 101. Thus, the winker state information on the first vehicle 200 can be exhibited at a good timing in the second vehicle 201. This decreases a possibility of failure of group run due to an inappropriate exhibition timing of the winker state information.

First Mode of Embodiment

Figure 3:
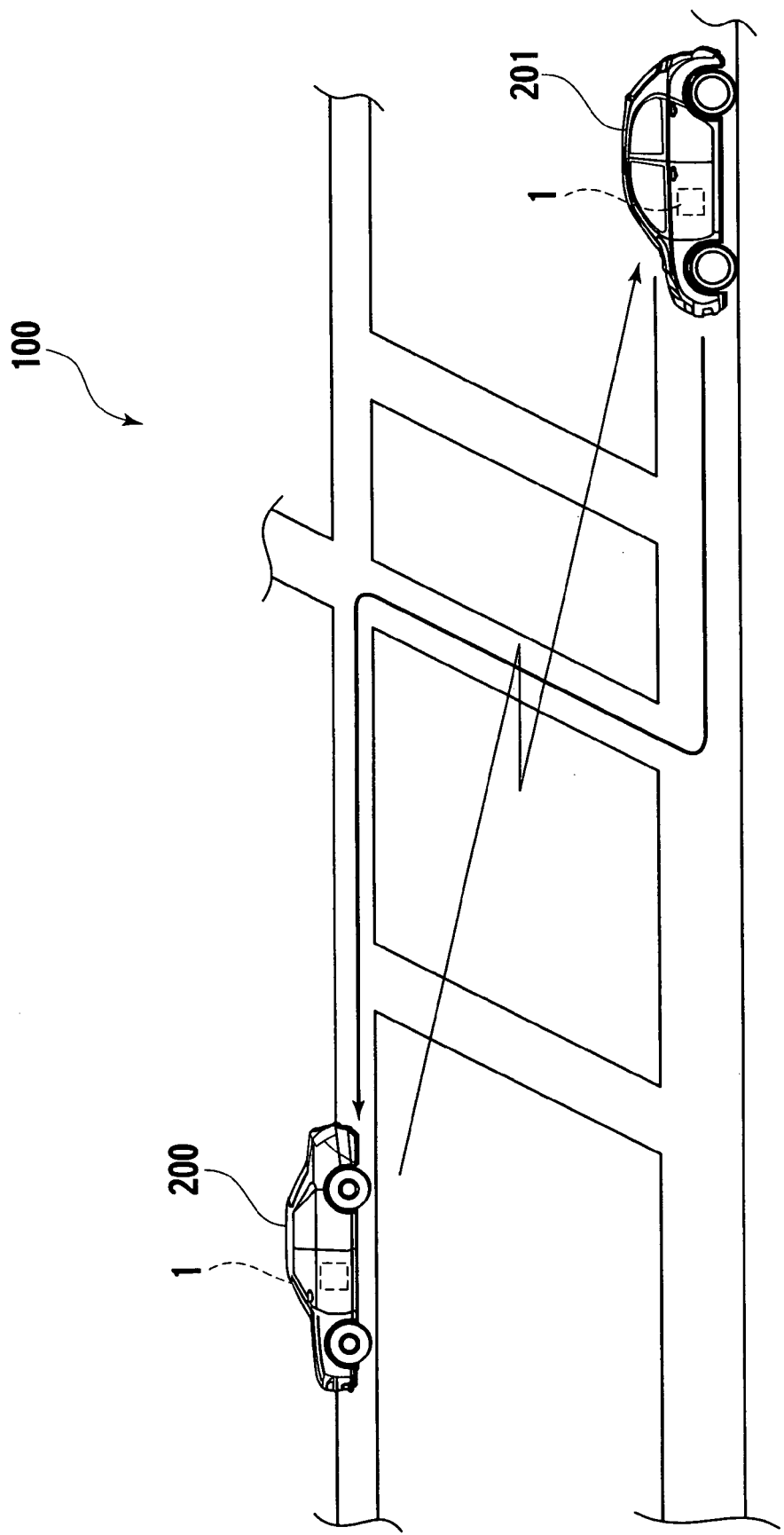
FIG. 3 is a constitutional view of a vehicle information processing system 100 according to a first mode of embodiment of the present invention.

FIG. 3 is a constitutional view of a vehicle information processing system 100 according to a first mode of embodiment of the present invention. As shown in this figure, the vehicle information processing system 100 conducts wireless communications between a preceding vehicle 200 and a succeeding vehicle 201, for example, to exhibit winker state information 220 on the preceding vehicle 200 to a driver of the succeeding vehicle 201. This vehicle information processing system 100 includes vehicle-mounted apparatuses 1 mounted on the preceding vehicle 200 and succeeding vehicle 201, respectively, and these vehicle-mounted apparatuses 1 conduct wireless communications therebetween.

Figure 4:
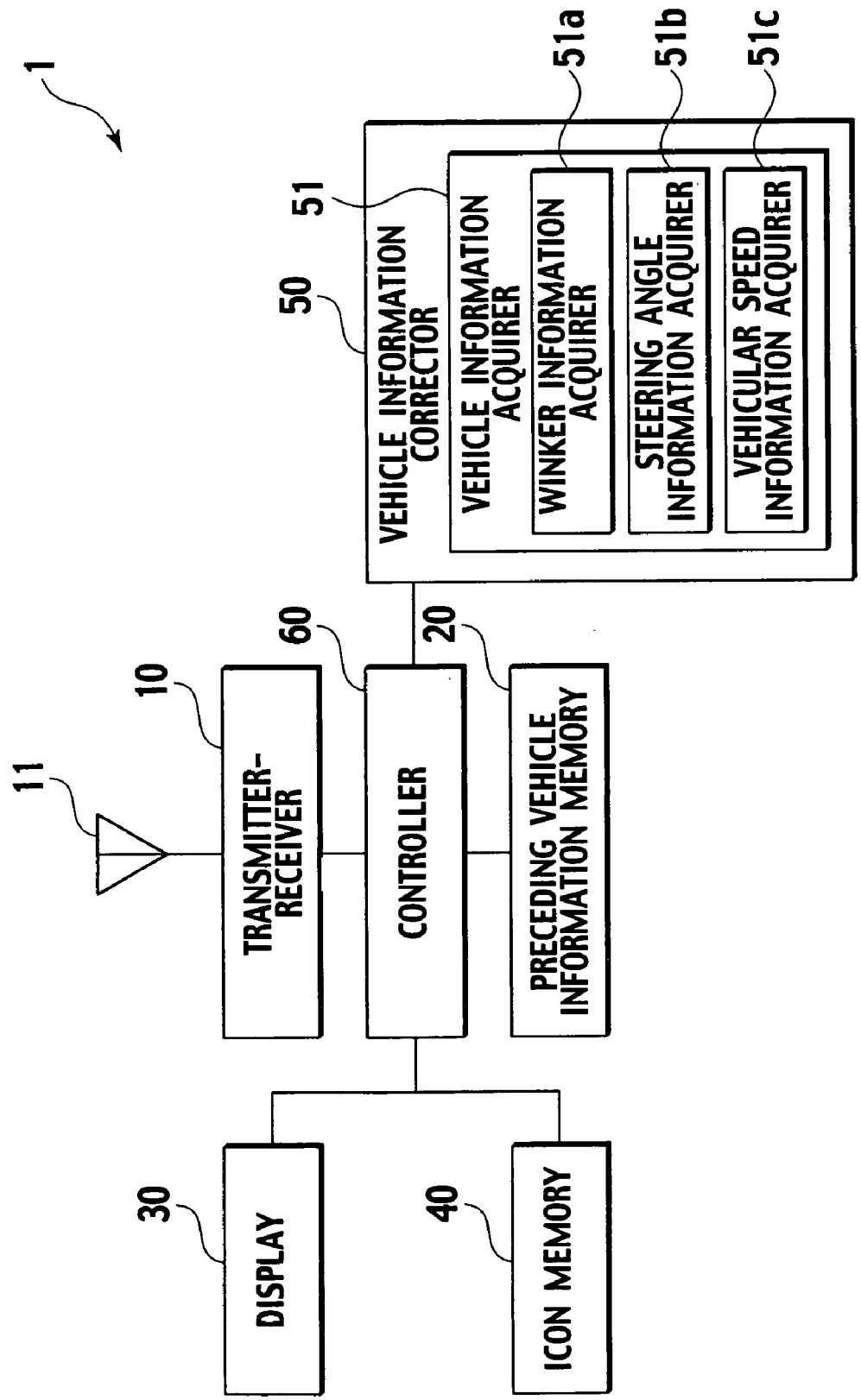
FIG. 4 is a detailed constitutional view of each vehicle-mounted apparatus 1 shown in FIG. 3.

FIG. 4 is a detailed constitutional view of each vehicle-mounted apparatus 1 shown in FIG. 3. As shown in FIG. 4, each vehicle-mounted apparatus 1 includes a transmitter-receiver (transmitter and receiver) 10, a preceding vehicle information memory 20, a display (exhibiter) 30, an icon memory 40, a vehicle information corrector (estimator and timing decider) 50, and a controller 60.

The transmitter-receiver 10 wirelessly communicates with another vehicle-mounted apparatus 1. This transmitter-receiver 10 transmits/receives information via antenna 11. Concretely, the transmitter-receiver 10 conducts communications by wireless LAN (Local Area Network) according to IEEE802.11b or IEEE802.11g, ETC (Electronic Toll Collection) communications, DSRC (Dedicated Short Range Communications), and the like. The transmitter-receiver 10 may conduct wide area wireless communications for cellular phone or PHS (Personal Handyphone System).

The preceding vehicle information memory 20 stores therein winker state information and the like transmitted from the preceding vehicle 200. The display 30 exhibits the winker state information 220 on the preceding vehicle 200 to the driver of the succeeding vehicle. It is desirable that the display 30 includes a function capable of displaying a map in a state including the preceding vehicle 200 and succeeding vehicle 201.

Figure 5:
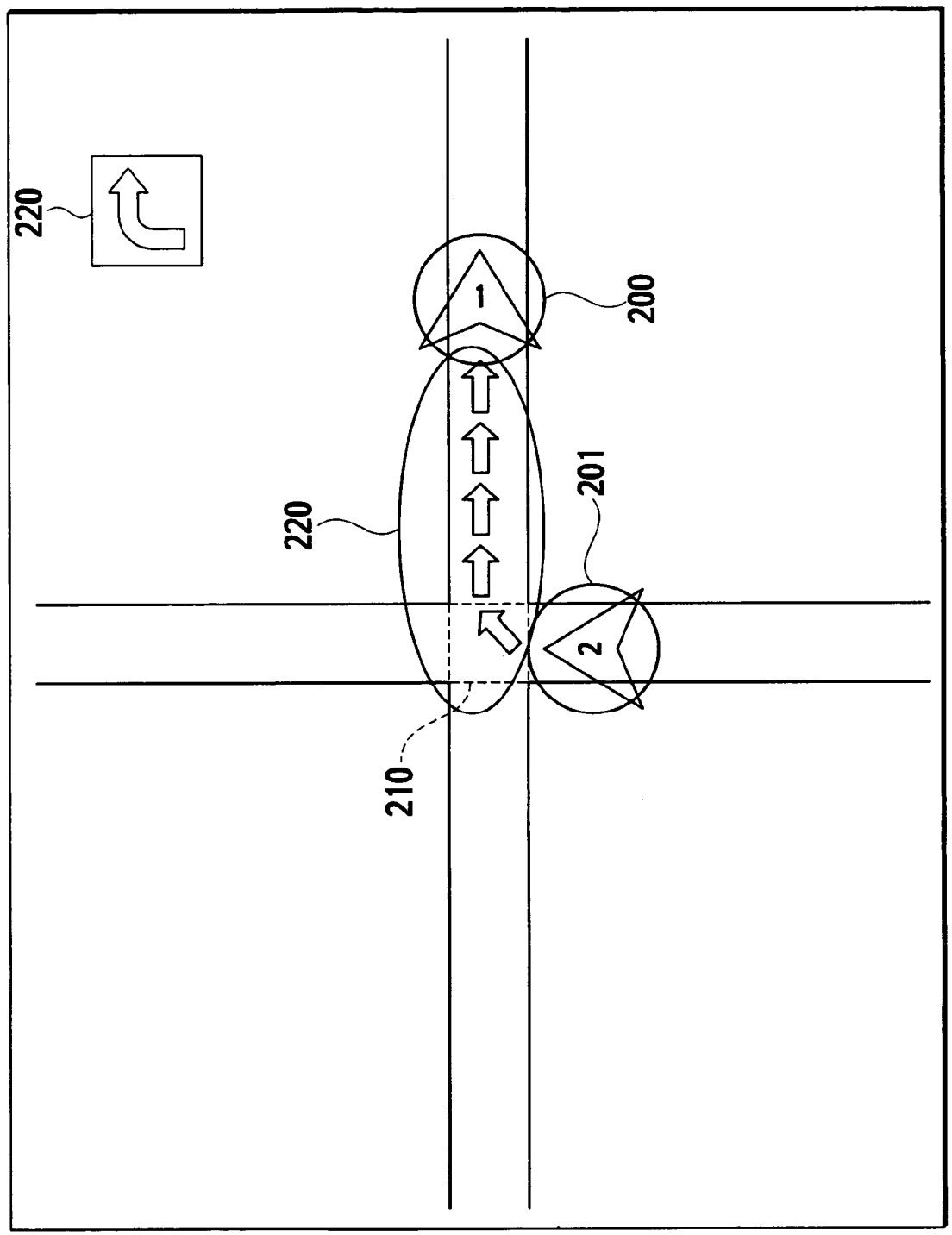
FIG. 5 is a view of an example of a map presentation by a display 30 shown in FIG. 4.

FIG. 5 is a view of an example of a map presentation by the display 30 of FIG. 4. As shown in FIG. 5, when the preceding vehicle 200 has turned to the right at the intersection 210, the display 30 of the succeeding vehicle 201 displays winker state information 220 for encouraging a right turn by a right-turn mark, or winker state information 220 for encouraging a right turn by showing a trajectory of the preceding vehicle 200, as the succeeding vehicle 201 approaches the intersection 210.

Figure 6:
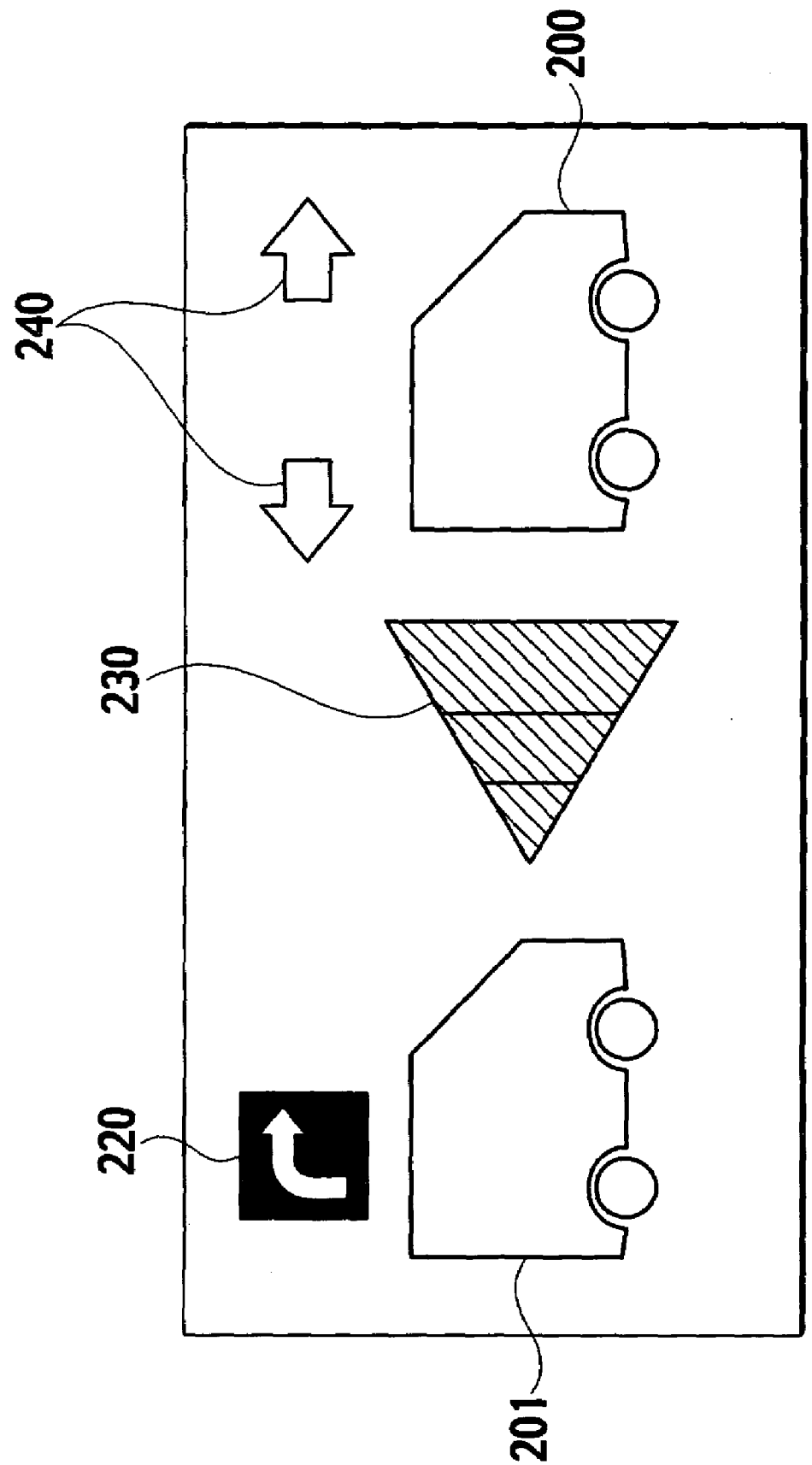
FIG. 6 is a view of an example of a simplified presentation by the display 30.

FIG. 6 is a view of an example of a simplified presentation by the display 30. In case of the simplified presentation, the display 30 displays icons representing the preceding vehicle 200 and succeeding vehicle 201, respectively, as shown in FIG. 6. The display 30 displays, between the preceding vehicle 200 and succeeding vehicle 201, information 230 representing a distance or throughput therebetween. The display 30 displays winker state information 220 above the icon of the succeeding vehicle 201, and winkers 240 of the preceding vehicle 200 above the icon of the preceding vehicle 200.

Referring again to FIG. 4, the icon memory 40 stores therein images of icons which are each required for displaying the preceding vehicle 200 by icon, for example. Concretely, the icon memory 40 stores therein icons as shown in FIG. 5 and FIG. 6. The vehicle information corrector 50 estimates a relationship between the preceding vehicle 200 and succeeding vehicle 201, and decides a timing for exhibiting winker state information 220 to the driver of the succeeding vehicle 201 based on the estimation result. The controller 60 controls the whole of the vehicle-mounted apparatus 1. The controller 60 is configured with a CPU (Central Processing Unit), and is connected to the above-mentioned components 10 through 50.

The vehicle information corrector 50 includes a vehicle information acquirer (information acquirer, second information acquirer) 51. The vehicle information acquirer 51 is connected to a navigation system to acquire therefrom various information (such as a current position, or a road shape where the vehicle is running). The vehicle information acquirer 51 has a winker information acquirer 51a for acquiring information on a winker state of the vehicle, a steering angle information acquirer 51b for acquiring information on a steering angle of a steering wheel, and a vehicular speed information acquirer 51c for acquiring information on a vehicular speed The vehicle information acquirer 51 provides the acquired information to the vehicle information corrector 50. Based on the information from the vehicle information acquirer 51, the vehicle information corrector 50 judges whether the timing for exhibiting the winker state information 220 is to be hastened or delayed.

According to such a vehicle information processing system 100, the vehicle-mounted apparatus 1 of the preceding vehicle 200 firstly operates, so that the vehicle information acquirer 51 thereof acquires winker state information 220 by the winker information acquirer 51a.

In addition to the winker state information 220, the vehicle information acquirer 51 acquires information on a running status of the preceding vehicle 200, from the steering angle information acquirer 51b, vehicular speed information acquirer 51c, and a navigation system (not shown). The running status information refers to information representing a state of own vehicle (such as vehicular speed, engine revolution speed for example), information representing environments during running (such as weather, running road shape, for example), and the like.

Thereafter, the transmitter-receiver 10 transmits the winker state information 220 and the running status information acquired by the vehicle information acquirer 51. In turn, the transmitter-receiver 10 of the vehicle-mounted apparatus 1 of the succeeding vehicle 201 receives the winker state information 220 and the running status information on the preceding vehicle 200.

Next the vehicle information acquirer 51 of the succeeding vehicle 201 acquires the running status information on the succeeding vehicle 201. The vehicle information corrector 50 of the succeeding vehicle 201 then reads the running status information on the succeeding vehicle 201 acquired by the vehicle information acquirer 51, and the running status information on the preceding vehicle 200 received by the transmitter-receiver 10.

Thereafter, the display 30 exhibits the winker state information 220 received by the transmitter-receiver 10, to the driver of the succeeding vehicle 201. At this time, the vehicle information corrector 50 estimates a running-related relationship between the preceding vehicle 200 and succeeding vehicle 201 based on the running status information on both of them, judges whether the exhibition timing of the winker state information 220 is to be hastened or delayed based on the estimation result, and causes the display 30 to exhibit the winker state information 220 at the judged timing.

This enables the exhibition timing of the winker state information 220 to be hastened to decrease a frequency of failure of follow-up running, such as when the traffic lane change of the preceding vehicle 200 was smooth upon right turn thereof at an intersection because of a small number of vehicles therearound whereas the traffic lane change of the succeeding vehicle 201 is not smooth upon right turn thereof at the intersection because of a large number of vehicles therearound.

Note that the vehicle information corrector 50 has been configured to acquire the relationship between the preceding vehicle 200 and succeeding vehicle 201 based on the running status information on both the preceding vehicle 200 and succeeding vehicle 201. Without limited thereto, it is possible to acquire a relationship between the preceding vehicle 200 and succeeding vehicle 201 by acquiring running status information on one of the preceding vehicle 200 and succeeding vehicle 201 while assuming a running status of the other.

Figure 7:
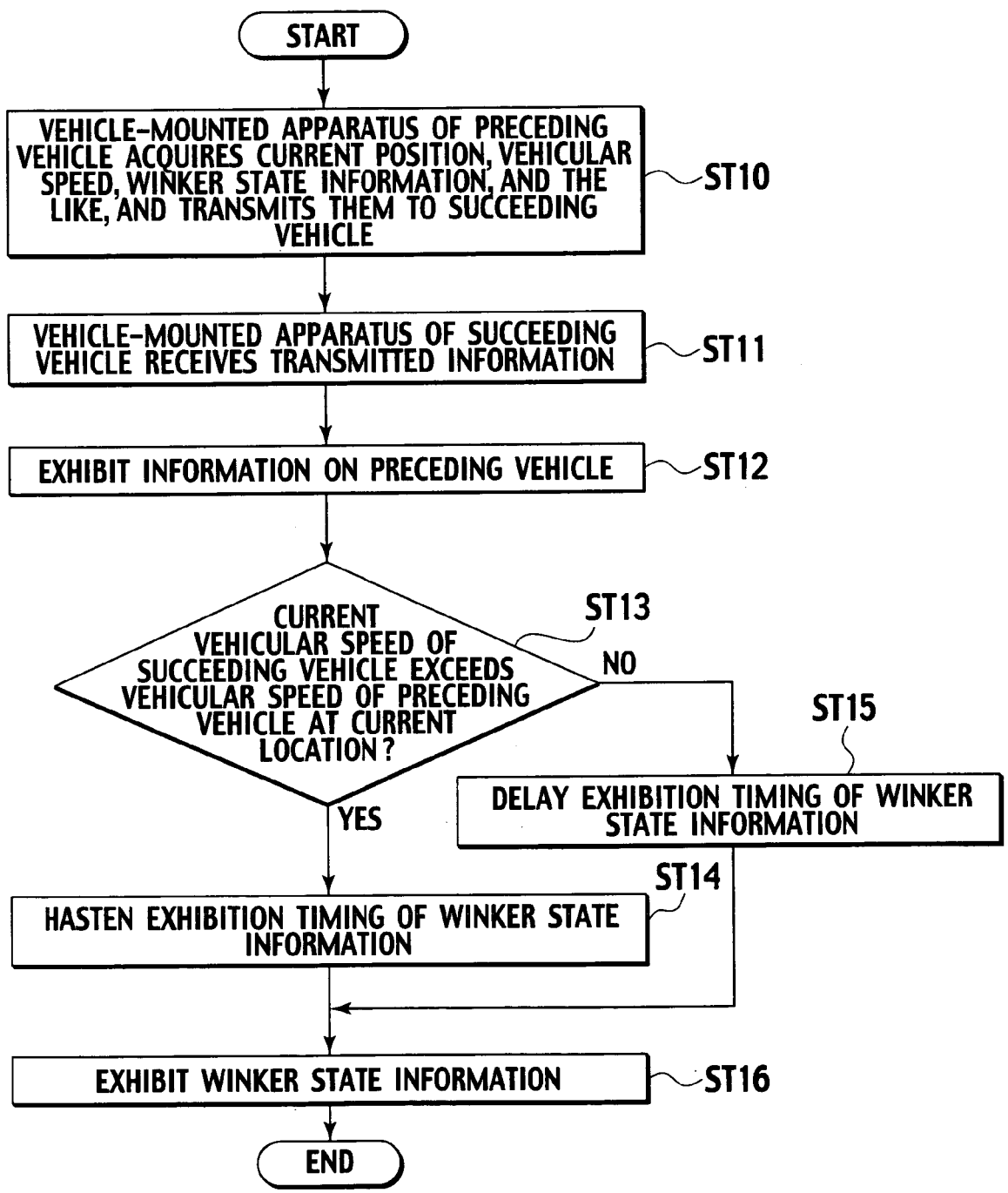
FIG. 7 is a flowchart of a detailed operation of the vehicle information processing system 100 according to the first mode of embodiment.

There will be explained a detailed operation of the vehicle information processing system 100 according to the first mode of embodiment FIG. 7 is a flowchart of the detailed operation of the vehicle information processing system 100 according to the first mode of embodiment.

As shown in this figure and in the vehicle information processing system 100, the vehicle information acquirer 51 of the preceding vehicle 200 acquires a current position, a vehicular speed, and winker state information 220 of/on the preceding vehicle 200, and these information are transmitted by the transmitter-receiver 10 (ST10). Namely, the vehicle-mounted apparatus 1 of the preceding vehicle 200 transmits the winker state information 220 and the running status information.

Next, the transmitter-receiver 10 of the succeeding vehicle 201 receives the transmitted current position, vehicular speed, and winker state information 220 (ST11). Namely, the vehicle-mounted apparatus 1 of the succeeding vehicle 201 receives the winker state information 220 and the running status information on the preceding vehicle 200.

Figure 8:
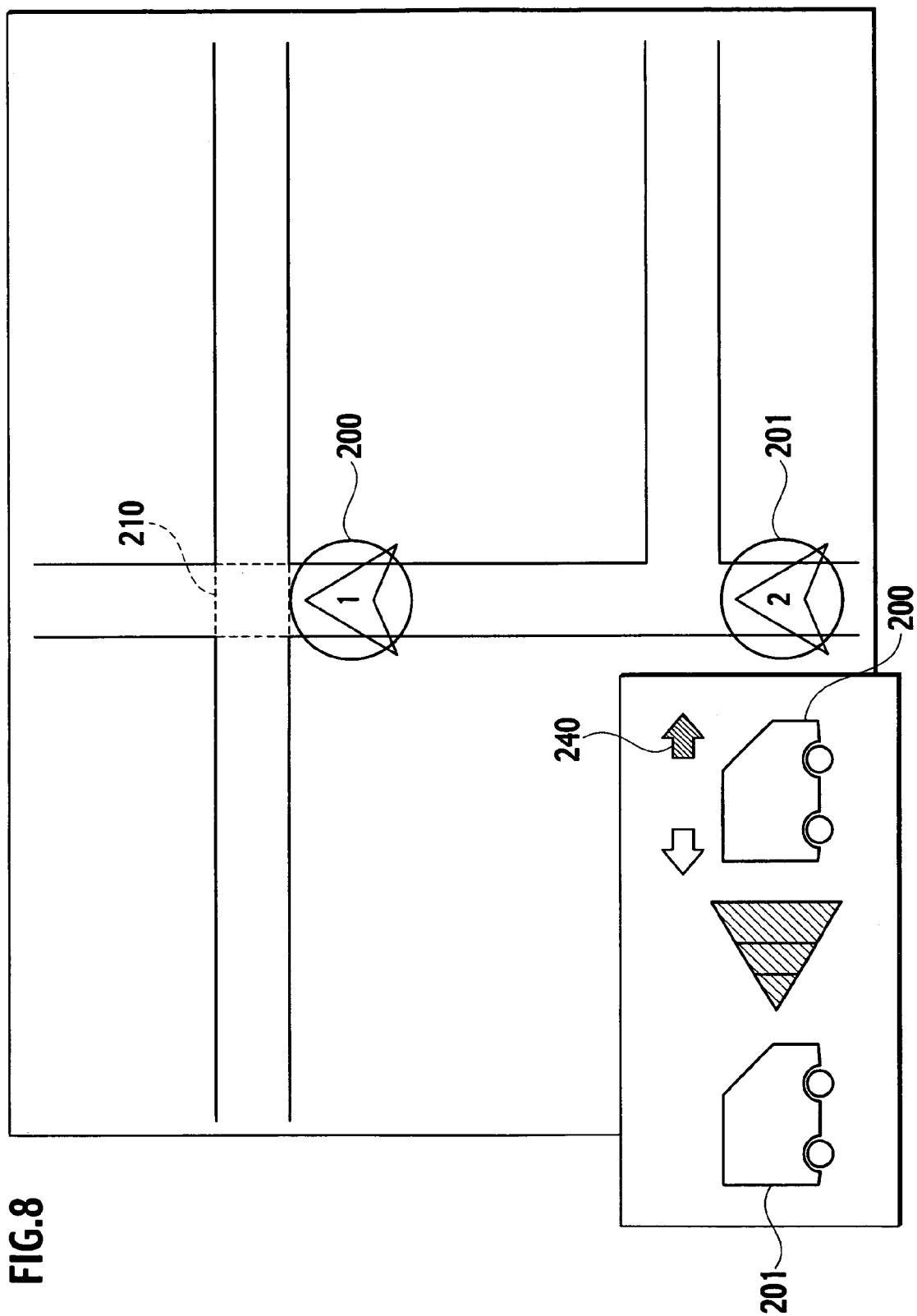
FIG. 8 is a view of an exemplary exhibition of information at step ST12 of FIG. 7.

Then, the display 30 of the succeeding vehicle 201 exhibits the information on the preceding vehicle 200 (ST12). FIG. 8 is a view of an exemplary exhibition of information at step ST12 of FIG. 7. As shown in FIG. 8, the display 30 of the succeeding vehicle 201 exhibits a winker 240 itself of the preceding vehicle 200 together with the running status information (such as current position) of the preceding vehicle 200, when the preceding vehicle 200 is about to turn to the right at an intersection 210.

Referring again to FIG. 7, after the display 30 has exhibited the information on the preceding vehicle 200, the vehicle information corrector 50 of the succeeding vehicle 201 judges whether or not the current vehicular speed of the succeeding vehicle 201 exceeds the vehicular speed of the preceding vehicle 200 at a current location of the succeeding vehicle 201 (ST13). When the vehicle information corrector 50 has judged (ST13: YES) that the current vehicular speed of the succeeding vehicle 201 exceeds the vehicular speed of the preceding vehicle 200 at the current location of the succeeding vehicle 201, the vehicle information corrector 50 judges that the exhibition timing of the winker state information 220 is to be hastened (ST14). Namely, when the vehicular speed of the succeeding vehicle 201 exceeds the vehicular speed of the preceding vehicle 200 at issue, the driver of the succeeding vehicle 201 has to conduct a braking operation earlier than the preceding vehicle 200. As such, when the vehicular speed of the succeeding vehicle 201 exceeds the vehicular speed of the preceding vehicle 200, the vehicle information corrector 50 judges that the exhibition timing of the winker state information 220 is to be hastened to encourage deceleration.

Contrary, when the vehicle information corrector 50 has judged (ST13: NO) that the current vehicular speed of the succeeding vehicle 201 does not exceed the vehicular speed of the preceding vehicle 200 at the current location of the succeeding vehicle 201, the vehicle information corrector 50 judges that the exhibition tiling of the winker state information 220 is to be delayed (ST15). Namely, when the vehicular speed of the succeeding vehicle 201 is equal to or less than the vehicular speed of the preceding vehicle 200 (ST13: NO), the driver of the succeeding vehicle 201 has a slight leeway for a braking operation as compared with the preceding vehicle 200. As such, when the vehicular speed of the succeeding vehicle 201 is equal to or less than the vehicular speed of the preceding vehicle 200, the vehicle information corrector 50 judges that the exhibition timing of the winker state information 220 is to be delayed.

Then, the display 30 exhibits the winker state information 220 at the judged exhibition timing (ST16). Thereafter, the operation of FIG. 7 is completed, and repeated until the electric-power source of the vehicle-mounted apparatus 1 is turned off.

Figure 9:
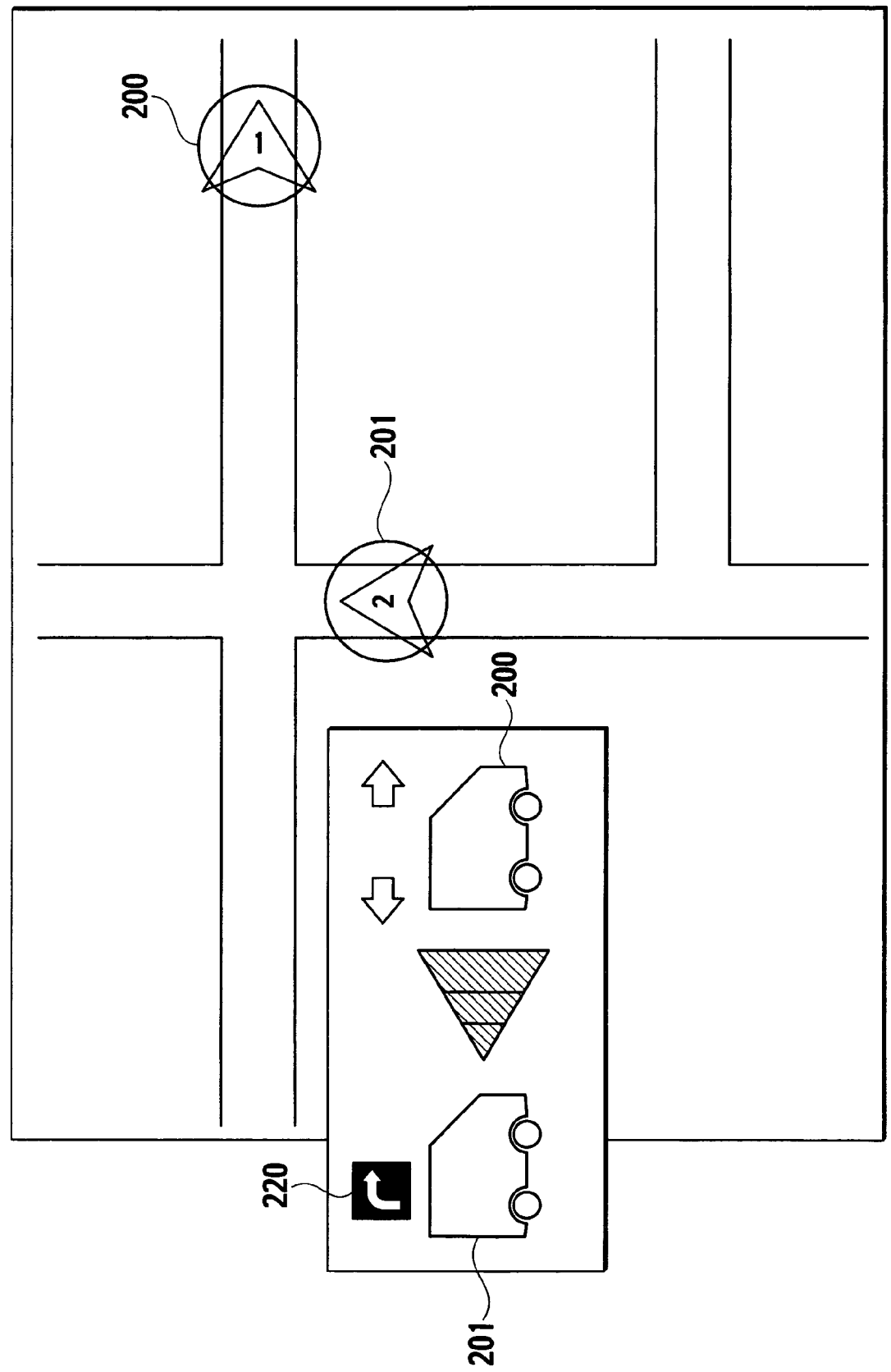
FIG. 9 is a view of an exemplary exhibition of winker state information 220.

FIG. 9 is a view of an exemplary exhibition of winker state information 220. As shown in this figure, the display 30 of the succeeding vehicle 201 displays winker state information 220 for encouraging the succeeding vehicle 201 to tan to the right, for example. At this time, the exhibition timing is judged by the vehicle information corrector 50 so that the winker state information 220 is displayed at such a suitable timing, in the manner as explained with reference to the flowchart of FIG. 7. Further, since the winker state information 220 is displayed at the suitable timing, there is decreased a frequency of failure of a right turn by the driver of the succeeding vehicle 201, thereby further decreasing a frequency of failure of group run.

Note that it is possible for the display 30 to exhibit, in advance of the winker state information 220, at least one of information to brake, and information to shift down, when the current vehicular speed of the succeeding vehicle 201 at the current location of the succeeding vehicle 201 exceeds the vehicular speed of the preceding vehicle 200.

Figure 10:
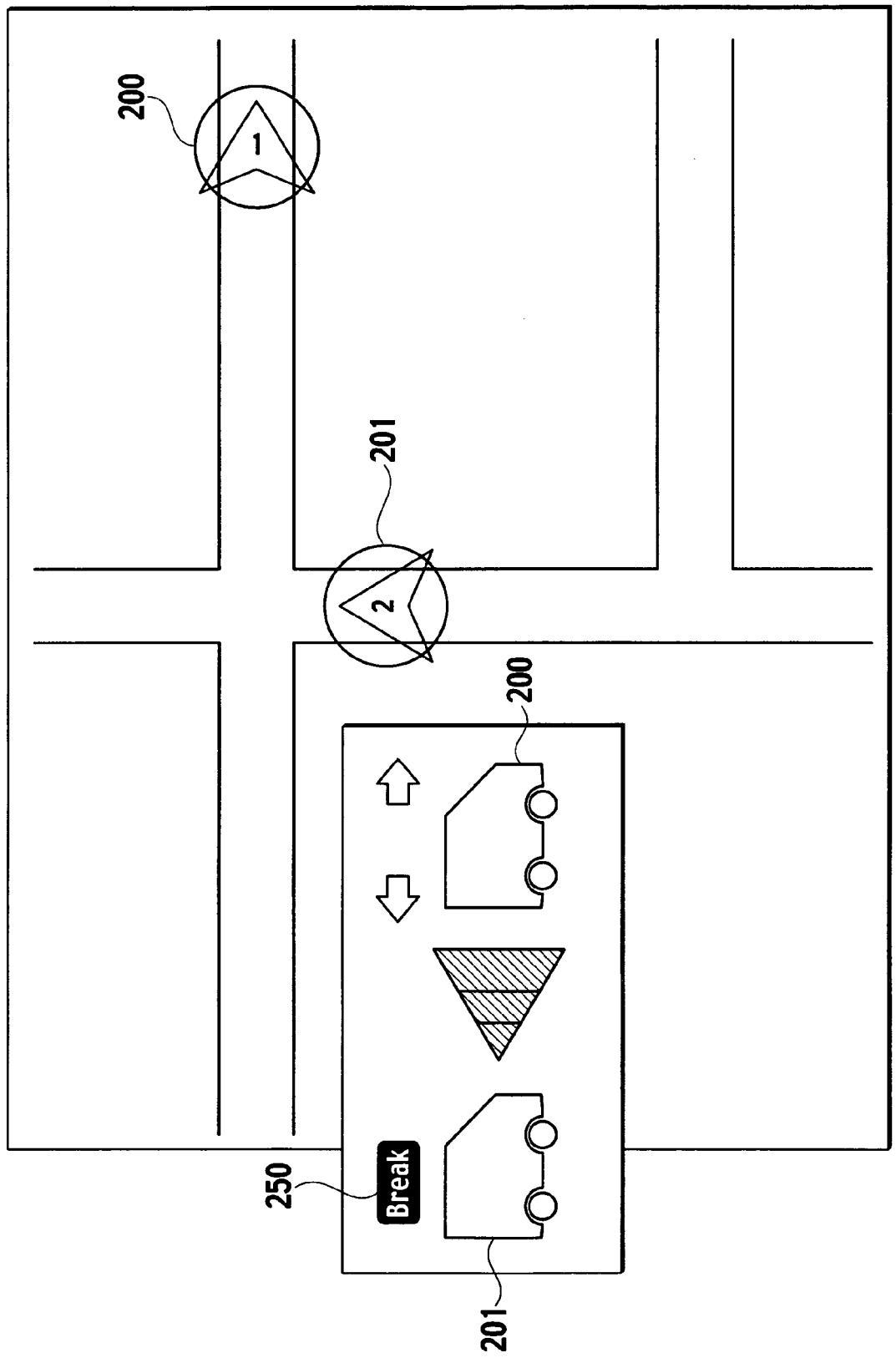
FIG. 10 is a view of an exemplary exhibition of information to brake.
Figure 11:
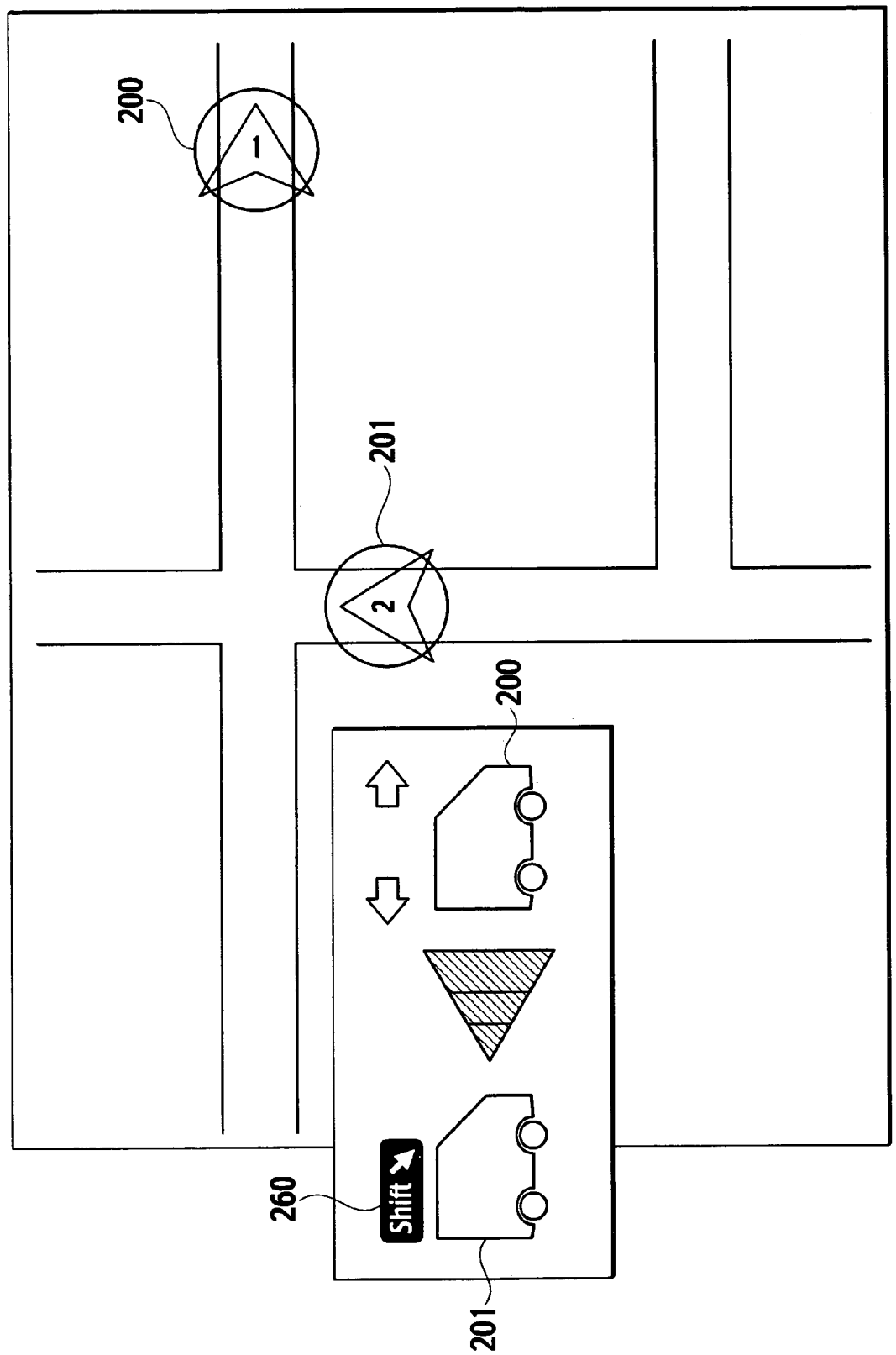
FIG. 11 is a view of an exemplary exhibition of information to shift down.

FIG. 10 is a view of an exemplary exhibition of information to brake, and FIG. 11 is a view of an exemplary exhibition of information to shift down. As shown in FIG. 10, the display 30 exhibits information 250 to brake, in advance of the winker state information 220. This allows the vehicle information processing system 100 to exactly suggest deceleration when early deceleration is required in case of a right or left turn.

As shown in FIG. 11, it is equally possible for the display 30 to exactly suggest deceleration, also by exhibiting information 260 to shift down, in advance of the winker state information 220. This promotes conduction of follow-up running, thereby further decreasing a frequency of failure of group run.

In this way, according to the vehicle information processing system 100 of the first mode of embodiment, there is estimated a running-related relationship between the first vehicle 200 and second vehicle 201, to decide the exhibition timing at which the winker state information 220 on the first vehicle 200 is exhibited to the driver of the second vehicle 201 depending on the estimation result. As such, the winker state information 220 on the first vehicle 200 can be exhibited at a suitable timing in the second vehicle 201. This deceases a possibility of failure of group run due to an inappropriate exhibition timing of the winker state information 220. Thus, there can be decreased a frequency of failure of group run (effects of claims 1 and 2).

The first vehicle 200 includes, mounted thereon, the winker information acquirer 51a for acquiring winker state information 220 on the first vehicle 200, and the transmitter-receiver 10 for transmitting the winker state information 220. In turn, the second vehicle 201 includes, mounted thereon, the transmitter-receiver 10 for receiving the winker state information 220 on the first vehicle 200, and the vehicle information corrector 50 for deciding an exhibition timing of the winker state information 220. As such, it becomes unnecessary to estimate a winker state of the first vehicle 200 from the outside of the first vehicle 200 (such as the second vehicle 201 or information center), so that degradation of an accuracy of the winker state information 220 to be exhibited in the second vehicle 201 can be avoided (effects of claims 3 and 4).

Particularly, the transmitter-receiver 10 mounted on the first vehicle 200 transmits the winker state information 220 to the second vehicle 201, and the transmitter-receiver 10 mounted on the second vehicle 201 receives the winker state information 220 from the first vehicle 200. As such, there can be conducted transmission and receipt of information directly between the vehicles without through an information center (effect of claim 5).

In the vehicle information processing system 100 of this mode of embodiment, since the second vehicle 201 is to run by following the first vehicle 200, there can be decreased a frequency of failure of follow-up running (effect of claim 6).

The vehicle information corrector 50 judges whether an exhibition timing of the winker state information 220 is to be hastened or delayed, based on the running status information on the preceding vehicle 200. As such, the exhibition timing of the winker state information 220 is decided based on an actual situation acquired by running of the preceding vehicle in advance of the succeeding vehicle 201. In this way, the exhibition timing is decided depending on the actual situation even when a new road has been established or when road construction or traffic congestion is present, so that the winker state information 220 is exhibited at a more suitable timing in the succeeding vehicle 201. This allows a frequency of failure of follow-up running to be further decreased (effect of claim 9).

The vehicle information corrector 50 judges whether the exhibition timing of the winker state information 220 is to be hastened or delayed based on the running status information on the succeeding vehicle 201 in addition to the running status information on the preceding vehicle 200. As such, the exhibition timing of the winker state information 220 is decided based on the same aspect and a different aspect between the preceding vehicle 200 and succeeding vehicle 201 in running status, thereby enabling a more suitable timing. This allows a frequency of failure of follow-up running to be further decreased (effect of claim 12).

The vehicle information corrector 50 judges that the exhibition timing is to be hastened when the current vehicular speed of the succeeding vehicle 201 exceeds the vehicular speed of the preceding vehicle 200 at the current location of the succeeding vehicle 201, and the vehicle information corrector 50 judges that the exhibition timing is to be delayed when the current vehicular speed of the succeeding vehicle 201 does-not exceed the vehicular speed of the preceding vehicle 200 at the current location of the succeeding vehicle 201. When the vehicular speed of the succeeding vehicle 201 exceeds the vehicular speed of the preceding vehicle 200 at issue, the driver of the succeeding vehicle 201 has to conduct a braking operation earlier than the preceding vehicle 200. As such, when the vehicular speed of the succeeding vehicle 201 exceeds the vehicular speed of the preceding vehicle 200, the vehicle information corrector 50 judges that the exhibition timing of the winker state information 220 is to be hastened to encourage early deceleration. Contrary, when the vehicular speed of the succeeding vehicle 201 is equal to or less than the vehicular speed of the preceding vehicle 200, the driver of the succeeding vehicle 201 has a slight leeway for a braking operation as compared with the preceding vehicle 200. As such, when the vehicular speed of the succeeding vehicle 201 is equal to or less than the vehicular speed of the preceding vehicle 200, the vehicle information corrector 50 judges that the exhibition timing of the winker state information 220 is to be delayed In this way, the winker state information 220 is exhibited at a suitable timing, in view of the relationship between the preceding vehicle 200 and succeeding vehicle 201. This allows a frequency of failure of follow-up running to be further decreased (effects of claims 13 and 14).

The display 30 exhibits at least one of information 250 to brake, and information 260 to shift down in advance of the winker state information 220, when the vehicular speed of the succeeding vehicle 201 exceeds the vehicular speed of the preceding vehicle 200. This allows the display 30 to exactly suggest deceleration when early deceleration is required, so that the driver of the succeeding vehicle 201 is promoted to readily conduct follow-up running. This allows a frequency of failure of follow-up running to be further decreased (effect of claim 15).

Note that the transmitter-receiver 10 according to the first mode of embodiment constantly and repetitively conducts the judgment as to whether the exhibition timing of the winker state information 220 is to be hastened or delayed, as shown in the flowchart of FIG. 7. However, the vehicle information processing system 100 according to the first mode of embodiment is not limited to such a configuration of constant and repetitive conduction, and it is possible for the system to judge whether the exhibition timing is to be hastened or delayed in case of prediction that follow-up running of a succeeding vehicle 201 will be disordered, for example. Concretely, it is possible for the vehicle information processing system 100 according to the first mode of embodiment to judge an exhibition tiring of winker state information 220 in at least one of situations where the preceding vehicle 200 has made a right or left turn, where the preceding vehicle 200 has changed a traffic lane, and where the preceding vehicle 200 is about to pass through a toll gate of a toll road. This allows reduction of a processing burden of the vehicle information processing system 100, without executing a changing operation of an exhibition tiring in a situation where a change of an exhibition timing is unnecessary such as when the succeeding vehicle is capable of following the preceding vehicle 200 by simply advancing straightly on a road (effects of claims 7 and 8).

It is further possible that the vehicle information acquirer 51 of the preceding vehicle 200 acquires, as running status information on the preceding vehicle 200, information on a distance from the preceding vehicle 200 to an intersection at the time when its winker was operated, and that the vehicle information corrector 50 of the succeeding vehicle judges that the exhibition timing of winker state information 220 is to be hastened as such a distance is longer and judges that the exhibition timing of winker state information 220 is to be delayed as such a distance is shorter. Here, the distance from the preceding vehicle 200 to the intersection at the time when its winker was operated, can be regarded as a distance judged by a driver of the preceding vehicle 200 to be necessary for making a right or left turn at the intersection. As such, longer distances result in longer times required for preparation to make a right or left turn at the intersection. Contrary, shorter distances result in shorter times required for preparation to make a right or left turn at the intersection. Therefore, the vehicle information processing system 100 judges an exhibition timing depending on a distance from the preceding vehicle 200 to an intersection at the time when its winker was operated, thereby enabling exhibition of winker state information 220 at a suitable exhibition timing, to allow a frequency of failure of follow-up running to be further decreased (effect of claim 10).

Second Mode of Embodiment

There will be explained a second mode of embodiment of the present invention. Also the second mode of embodiment provides a vehicle information processing system 100 which is the same as that according to the first mode of embodiment except that the former is partially different from the latter in vehicle-mounted apparatus configuration and processing details.

Figure 12:
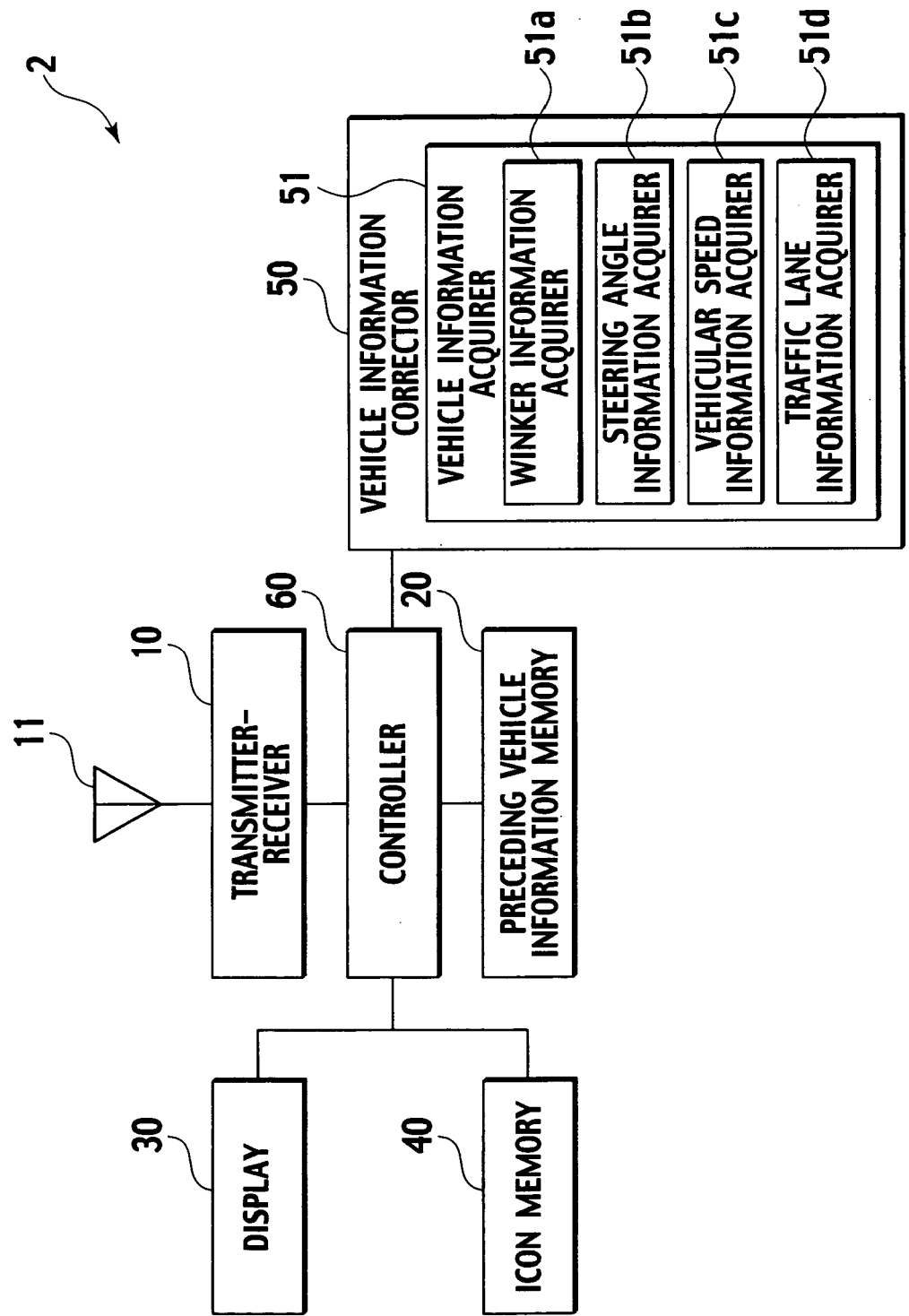
FIG. 12 is a constitutional view of a vehicle-mounted apparatus 2 according to a second mode of embodiment.

Further, there will be explained points of this mode of embodiment different from the first mode of embodiment. FIG. 12 is a constitutional view of a vehicle-mounted apparatus 2 according to the second mode of embodiment. As shown in this figure, the vehicle information acquirer 51 of the vehicle-mounted apparatus 2 according to the second mode of embodiment additionally includes a traffic lane information acquirer 51d.

The traffic lane information acquirer 51d detects a traffic lane of a road on which the vehicle is currently cruising, to acquire traffic lane information. The traffic lane information acquirer 51d acquires information on a cruising lane, from a positioning part of a car navigation system and a road map data including traffic lane information, for example. The traffic lane information acquirer 51d may be configured to acquire information on a cruising lane, from a DSRC or beacon provided at a roadside.

The vehicle information corrector 50 according to the second mode of embodiment includes the traffic lane information acquirer 51d, so that the vehicle information corrector 50 judges that an exhibition timing of winker state information 220 is to be hastened, when a cruising lane a preceding vehicle 200 has cruised down is different from a current cruising lane of a succeeding vehicle 201, at a current location of the succeeding vehicle 201.

The succeeding vehicle 201 may fail to suitably conduct a follow-up running, when the cruising lane of the succeeding vehicle 201 does not correspond to that of the preceding vehicle 200. For example, in case of inconsistency in cruising lane, the succeeding vehicle 201 has not suitably entered a right-turn lane or left-turn lane, thereby causing a possibility that the succeeding vehicle fails to make a right or left turn thereby failing to conduct a follow-up running. Also in a toll gate of a toll road, the succeeding vehicle 201 is forced to advance in a wrong one of branched directions unless the succeeding vehicle 201 cruises on the same lane as the preceding vehicle 200, thereby causing a possibility of failure of follow-up running. As such, the vehicle information processing system 100 according to the second mode of embodiment hastens an exhibition timing in case of inconsistency in cruising lane so as to early guide the succeeding vehicle 201 to the same traffic lane as that of the preceding vehicle 200, thereby enabling decrease of a possibility of failure of follow-up running.

Figure 13:
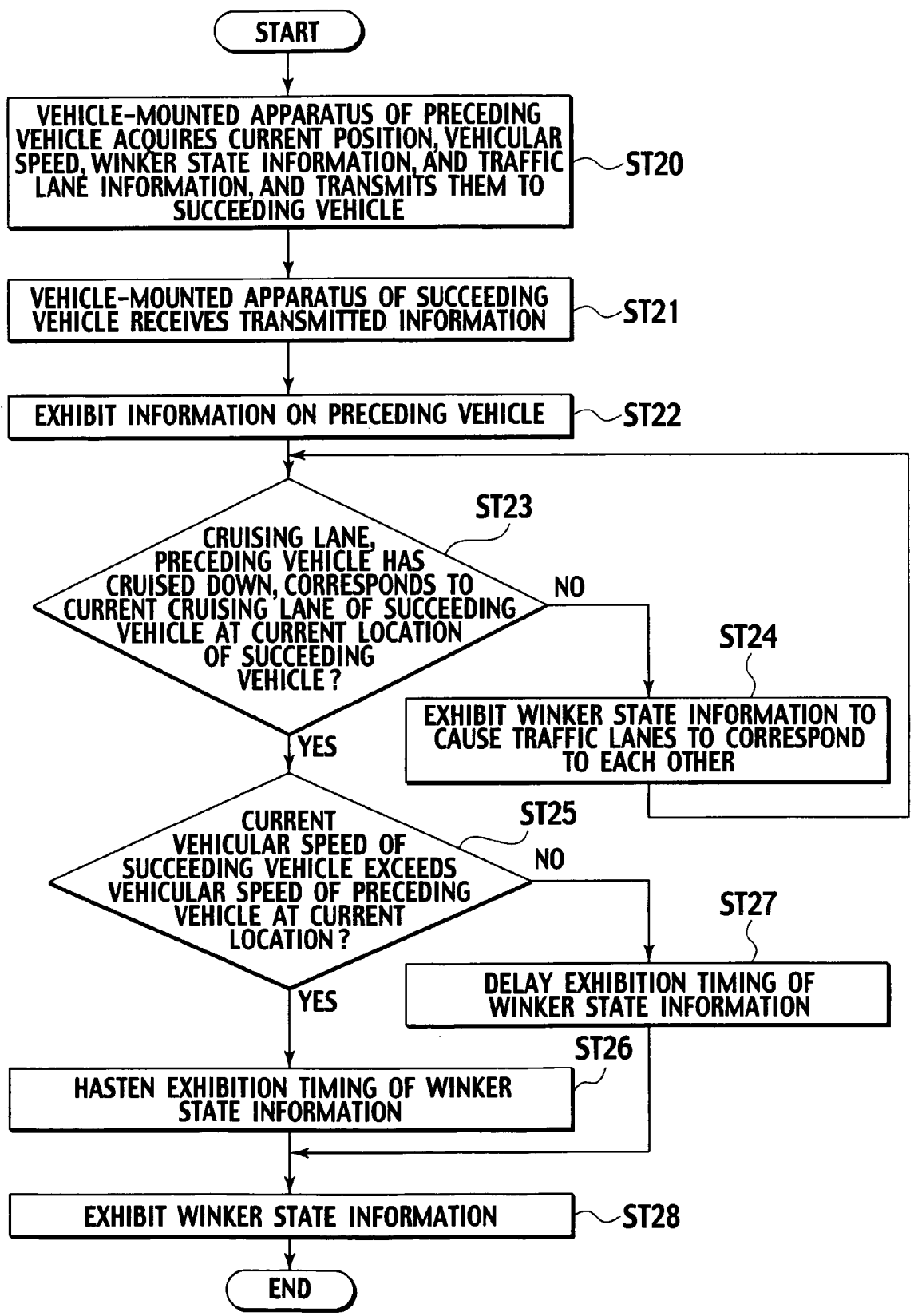
FIG. 13 is a flowchart of an operation of a vehicle information processing system 100 according to the second mode of embodiment.

There will be explained an operation of the vehicle information processing system 100 according to the second mode of embodiment. FIG. 13 is a flowchart of an operation of the vehicle information processing system 100 according to the second mode of embodiment. As shown in this figure and in the vehicle information processing system 100, the vehicle information acquirer 51 of the preceding vehicle 200 acquires a current position, a vehicular speed, winker state information 220, and traffic lane information of/on the preceding vehicle 200, and these information are transmitted by the transmitter-receiver 10 (ST20). Next, the transmitter-receiver 10 of the succeeding vehicle 201 receives the transmitted current position, vehicular speed, winker state information 220, and traffic lane information (ST21).

Figure 14:
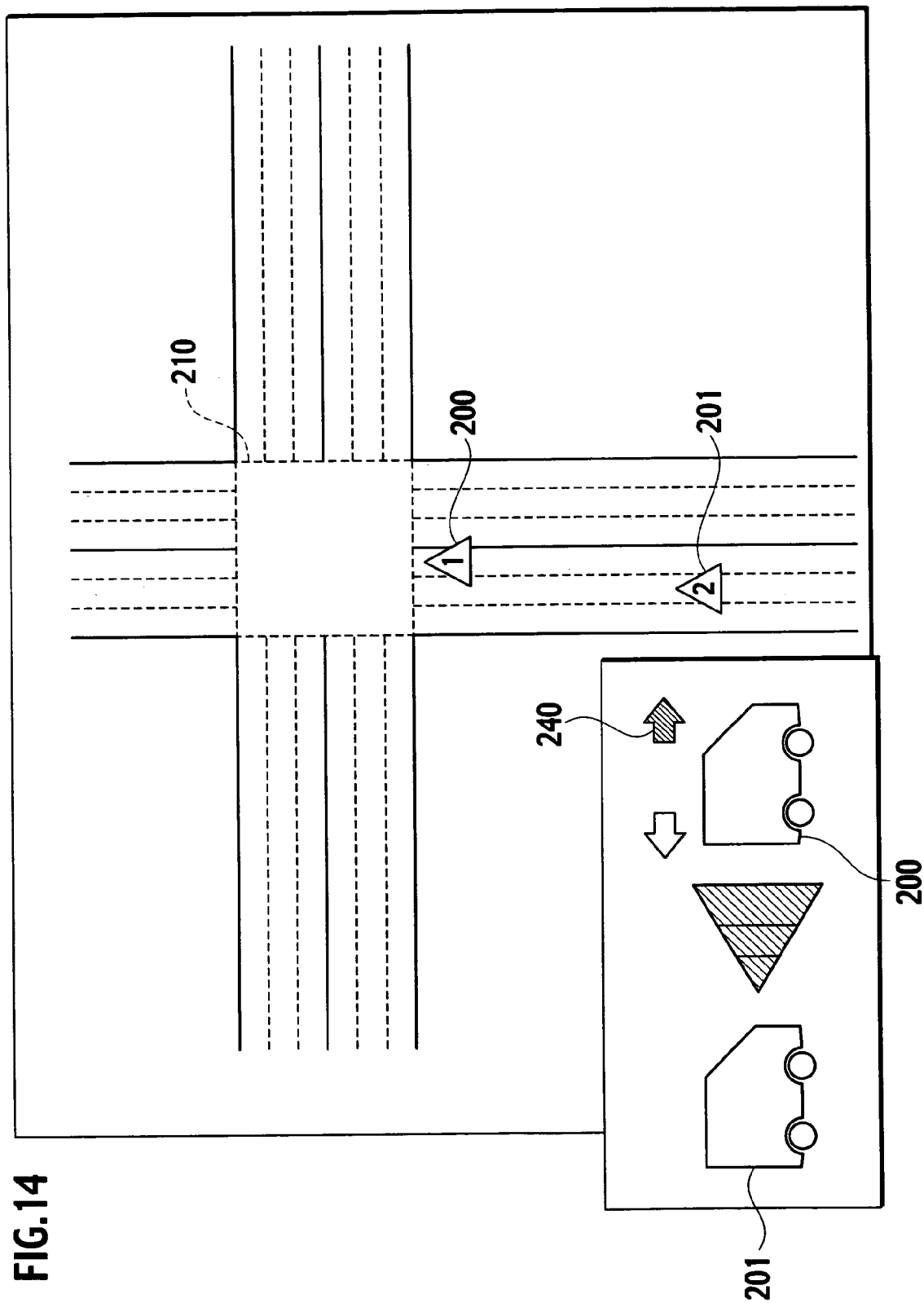
FIG. 14 is a view of an exemplary exhibition of information at step ST22 of FIG. 13.

Then, the display 30 of the succeeding vehicle 201 exhibits information on the preceding vehicle 200 (ST22). FIG. 14 is a view of an exemplary exhibition of information at step ST22 of FIG. 13. As shown in FIG. 14, when the preceding vehicle 200 is about to make a right turn at an intersection 210, the display 30 of the succeeding vehicle 201 exhibits a winker 240 itself of the preceding vehicle 200 together with running status information (current position and the like) of the preceding vehicle 200.

Referring again to FIG. 13, after the display 30 of the succeeding vehicle 201 has exhibited the information on the preceding vehicle 200, the vehicle information corrector 50 of the succeeding vehicle 201 judges whether or not the cruising lane the preceding vehicle 200 has cruised down corresponds to the current cruising lane of the succeeding vehicle 201 at a current location of the succeeding vehicle 201 (ST23). When the vehicle information corrector 50 has judged (ST23: NO) that the cruising lanes do not correspond to each other, the vehicle information corrector 50 judges that the exhibition timing of winker state information 220 is to be hastened. Then, the display 30 exhibits the winker state information 220 so as to make the traffic lanes to correspond to each other (ST24). At this time, the display 30 instantaneously exhibits the winker state information 220 without providing a wait time. Namely, the display 30 exhibits the exhibition timing in a hastened mariner.

Figure 15:
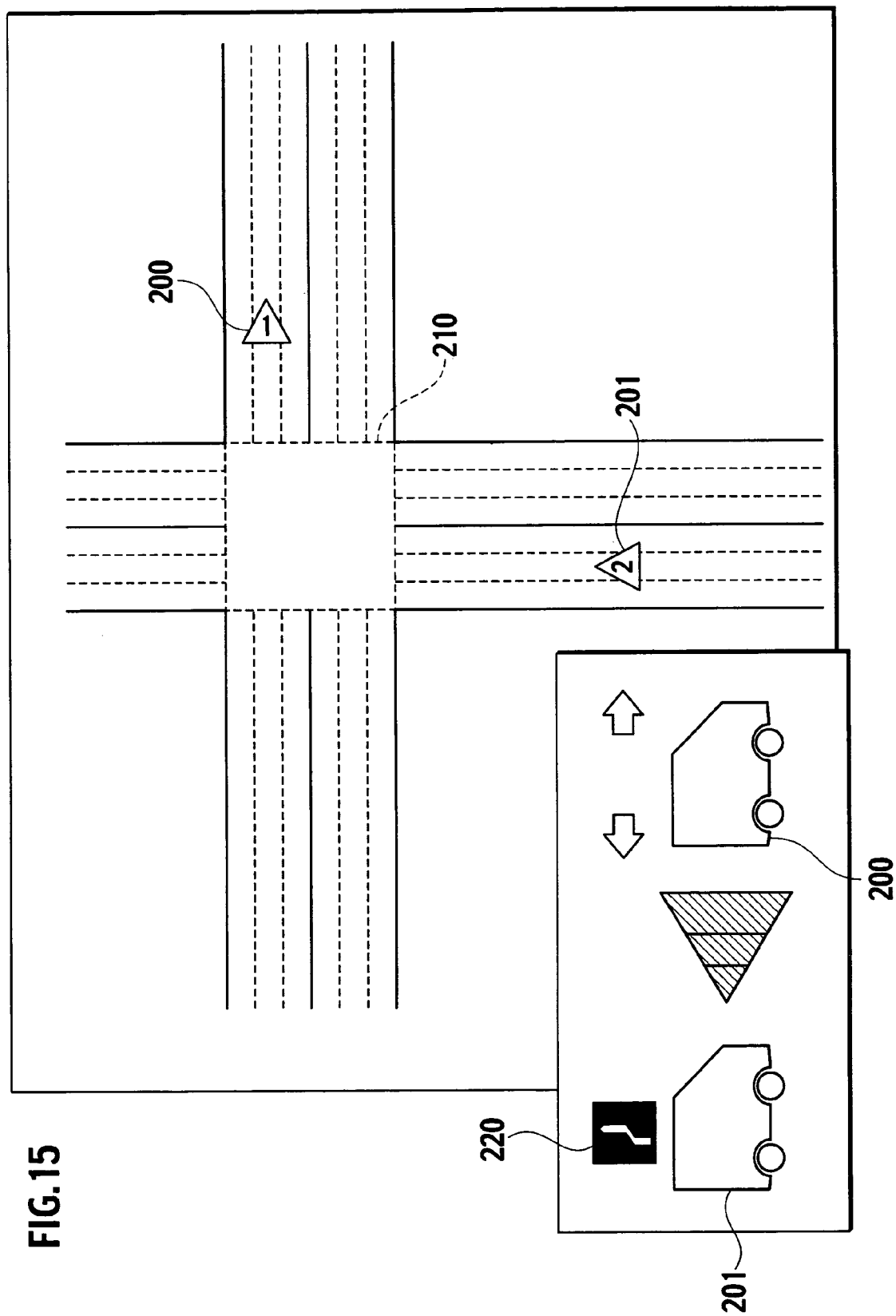
FIG. 15 is a first state view of exhibition of winker state information 220 in the second mode of embodiment.

FIG. 15 is a first state view of exhibition of winker state information 220 in the second mode of embodiment. As shown in this figure, the display 30 encourages a traffic lane change, by displaying the winker state information 220.

Referring again to FIG. 13, the operation flow goes to step ST23, after the display 30 has exhibited the winker state information 220 representing a traffic lane change. Then, there is again judged correspondence between the traffic lanes.

Contrary, when the vehicle information corrector 50 has judged (S123: YES) that the cruising lane the preceding vehicle 200 has cruised down corresponds to the current cruising lane of the succeeding vehicle 201, the operation flow goes to step ST25. At steps ST25 through ST28, there are executed the same procedures as those conducted at steps ST13 through ST16 shown in FIG. 7.

Figure 16:
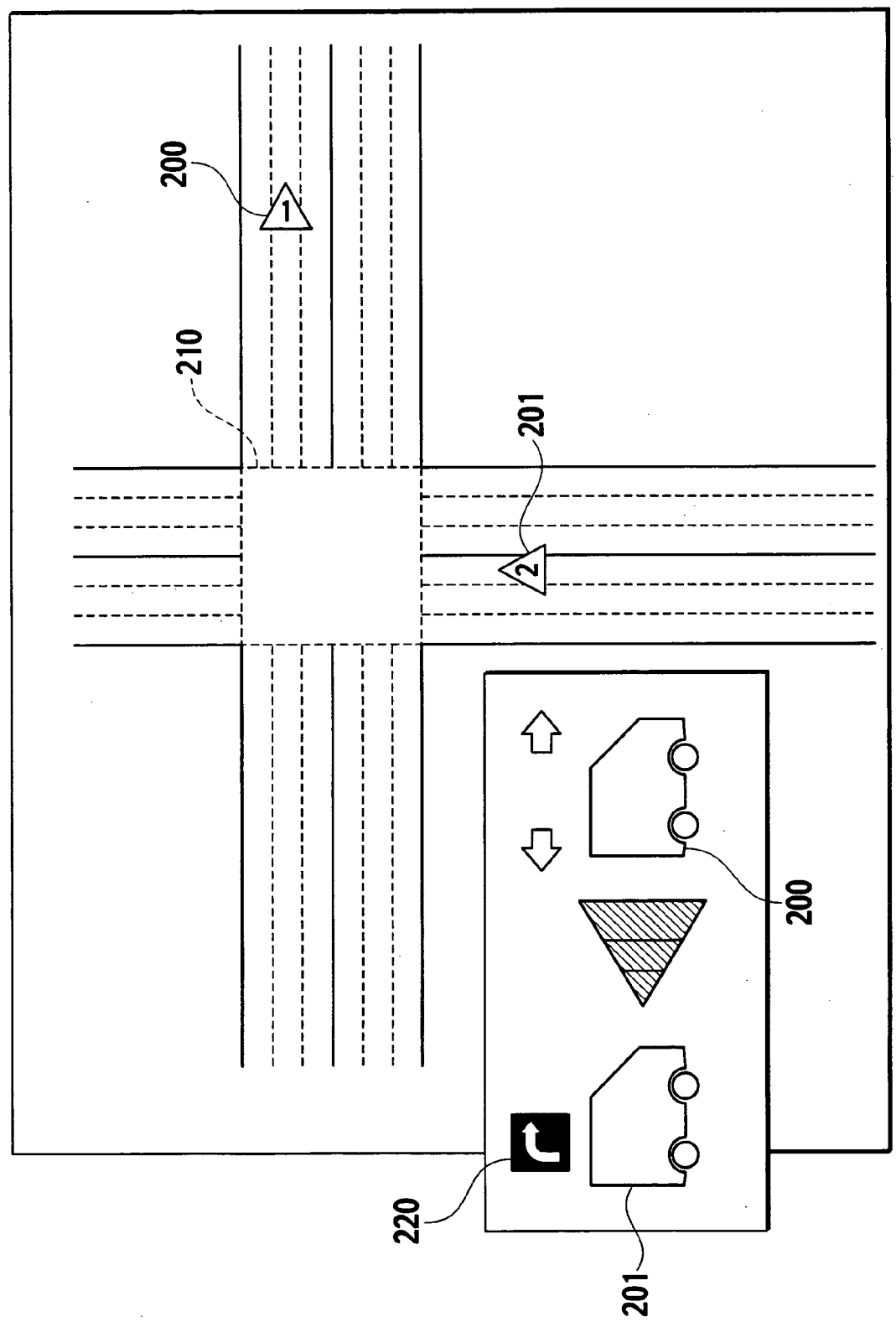
FIG. 16 is a second state view of exhibition of winker state information 220 in the second mode of embodiment.

Further, the exhibition shown in FIG. 16 is conducted at step ST28. FIG. 16 is a second state view of exhibition of winker state information 220 in the second mode of embodiment. As shown in this figure, the display 30 of the succeeding vehicle 201 displays the information 220 for encouraging a right turn. At this time, the exhibition timing is judged depending on the vehicular speed as shown in the flowchart of FIG. 13, to display the information at a suitable timing.

In this way, according to the vehicle information processing system 100 of the second mode of embodiment, there can be decreased a frequency of failure of group run (effects of claims 1 and 2), there can be avoided degradation of an accuracy of the winker state information 220 due to estimation (effects of claims 3 and 4), there can be conducted transmission and receipt of information directly between the vehicles without through an information center (effect of claim 5), there can be decreased a frequency of failure of follow-up running (effect of claim 6), there can be further decreased a frequency of failure of follow-up running (effects of claims 9, 10, 11, and 12 through 14), and there can be decreased a processing burden (effect of claims 7 and 8), identically to the first mode of embodiment.

Further, according to the vehicle information processing system 100 of the second mode of embodiment, it is judged that the exhibition timing is to be hastened, in the case where a cruising lane a preceding vehicle 200 has cruised down is different from a current cruising lane of a succeeding vehicle 201, at a current location of the succeeding vehicle 201. The succeeding vehicle 201 may fail to suitably conduct a follow-up running, in case of inconsistency in cruising lane. For example, in case of inconsistency in cruising lane, the succeeding vehicle 201 has not suitably entered a right-turn lane or left-turn lane, thereby causing a possibility that the succeeding vehicle fails to make a right or left turn thereby failing to conduct a follow-up running. Also in a toll gate of a toll road, the succeeding vehicle 201 is forced to advance in a wrong one of branched directions unless the succeeding vehicle 201 cruises on the same lane as the preceding vehicle 200, thereby causing a possibility of failure of follow-up running. As such, the vehicle information processing system 100 according to the second mode of embodiment is configured to hasten an exhibition timing in case of inconsistency in cruising lane so as to early guide the succeeding vehicle 201 to the same traffic lane as that of the pending vehicle 200, thereby decreasing a possibility of failure of follow-up running. This allows a frequency of failure of follow-up running to be further decreased (effect of claim 16).

Third Mode of Embodiment

There will be explained a third mode of embodiment of the present invention. Also the third mode of embodiment provides a vehicle information processing system 100 which is the same as that according to the second mode of embodiment, except that the former is partially different from the latter in vehicle-mounted apparatus configuration and processing details.

Figure 17:
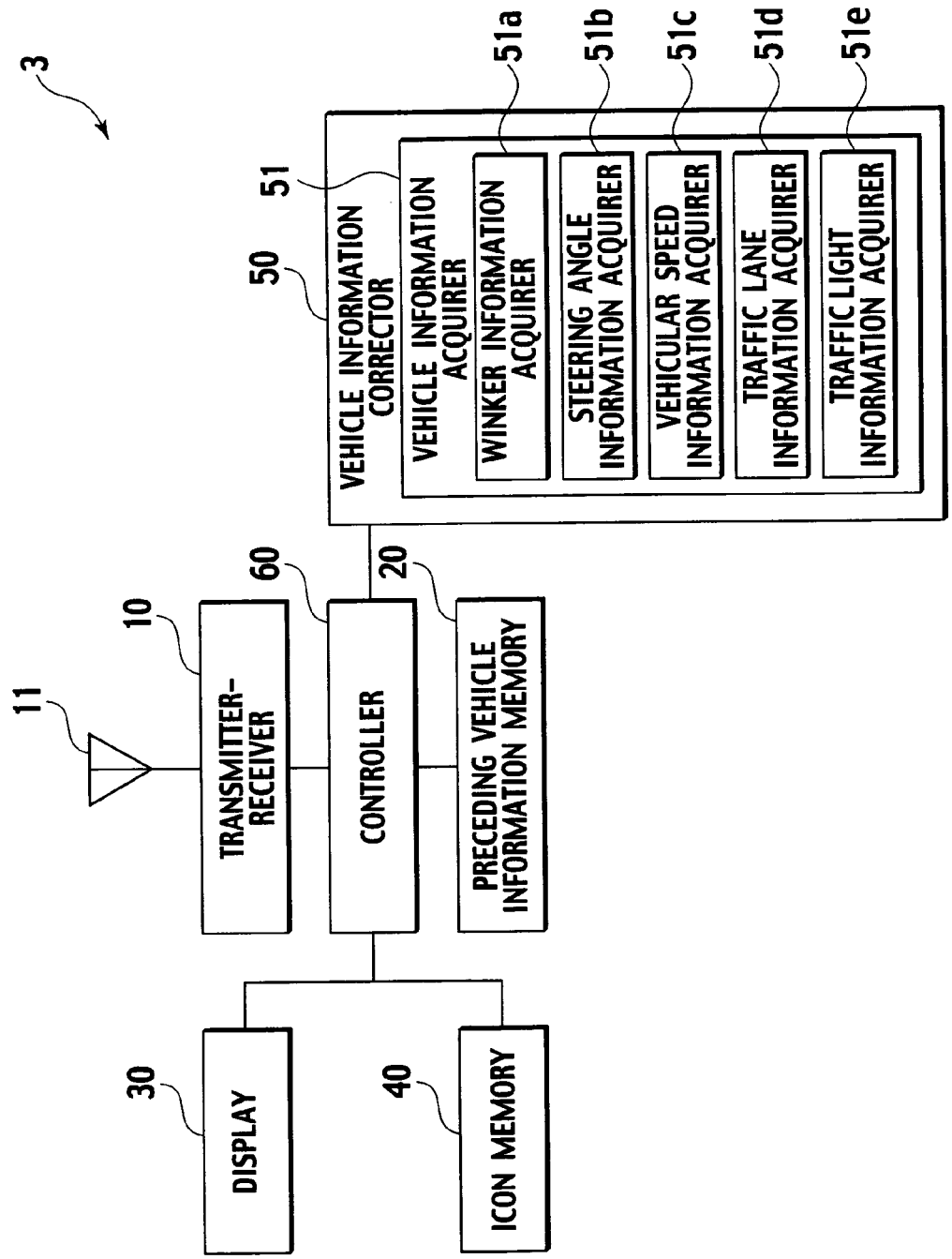
FIG. 17 is a constitutional view of a vehicle-mounted apparatus 3 according to a third mode of embodiment.

There will be explained points of this mode of embodiment different from the second mode of embodiment. FIG. 17 is a constitutional view of a vehicle-mounted apparatus 3 according to the third mode of embodiment. As shown in this figure, the vehicle-mounted apparatus 3 according to the third mode of embodiment additionally includes a traffic light information acquirer 51e.

The traffic light information acquirer 51e detects a state (red, green, or yellow) of a traffic light nearest to the vehicle in the forward direction. This traffic light information acquirer 51e acquires the information on the traffic light from a DSRC or beacon provided at the traffic light or an associated intersection.

Since the vehicle information corrector 50 according to the third mode of embodiment includes the traffic light information acquirer 51e, it judges that the exhibition timing of winker state information 220 is to be hastened, in case that a traffic light to be next passed by the succeeding vehicle 201 has been turned into green when the succeeding vehicle 201 is about to approach the traffic light though the traffic light was red when the preceding vehicle 200 approached it. Contrary, the traffic light information acquirer 51e judges that the exhibition timing of winker state information 220 is to be delayed, in case that a traffic light to be next passed by the succeeding vehicle 201 has been turned into red when the succeeding vehicle 201 is about to approach the traffic light though the traffic light was green when the preceding vehicle 200 approached it.

In case that the traffic light was red when the preceding vehicle 200 approached it, the preceding vehicle 200 should have decreased its speed. Contrary, in case that the traffic light is green when the succeeding vehicle 201 is about to approach it, the succeeding vehicle 201 need not to decrease its speed. As such, it is impossible for the succeeding vehicle 201 to cruise in the same manner as the preceding vehicle 200 to thereby cause a possibility of failure of follow-up running, unless deceleration is conducted by early exhibiting the winker state information 220. Thus, the vehicle information processing system 100 decides an exhibition timing of winker state information 220 based on a state of a traffic light, thereby allowing the succeeding vehicle 201 to cruise in the same manner as the preceding vehicle 200 even when traffic light states for the vehicles are different from each other, to thereby moderate failure of follow-up running.

Figure 18:
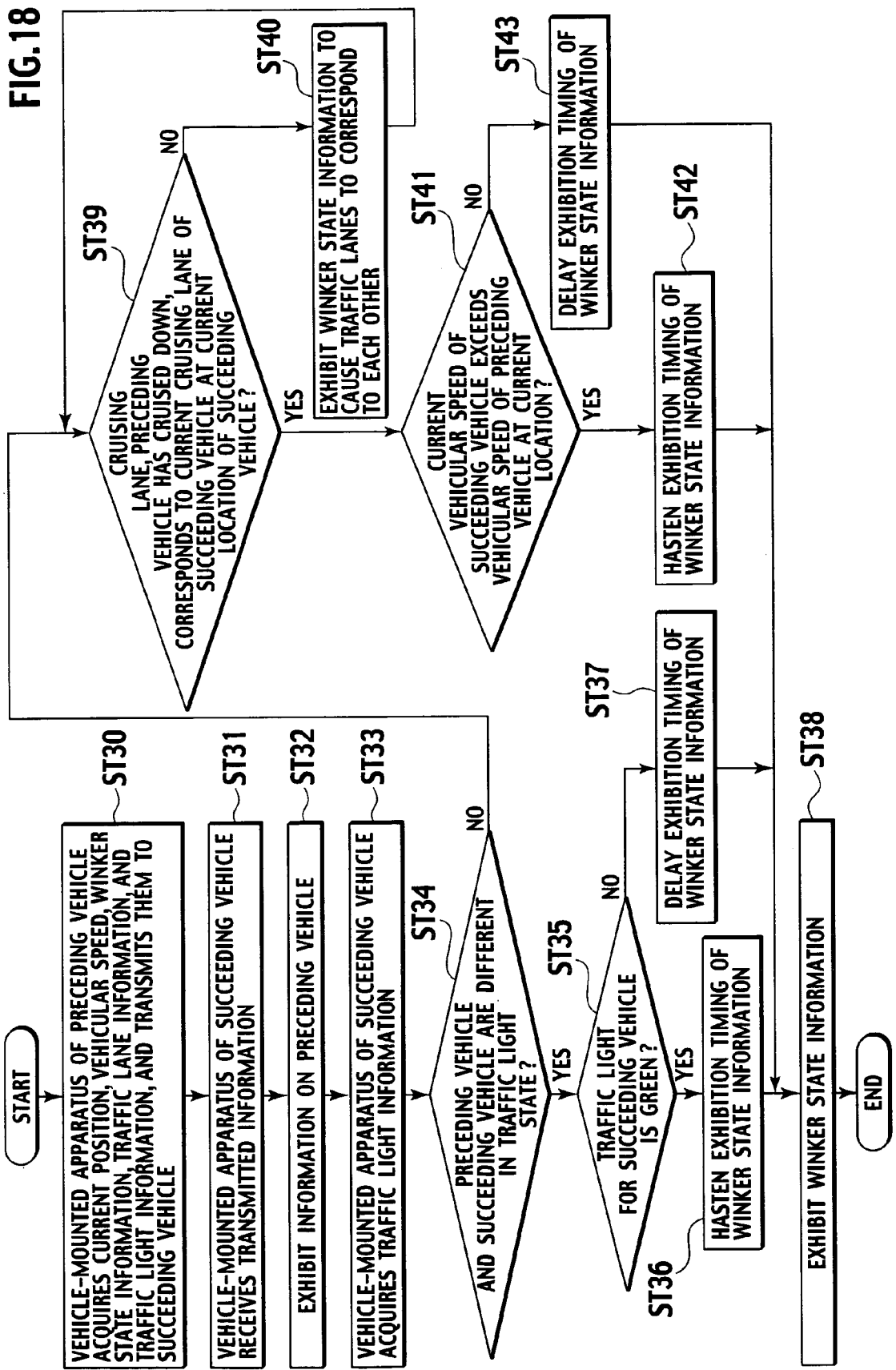
FIG. 18 is a flowchart of an operation of a vehicle information processing system 100 according to the third mode of embodiment.

There will be explained an operation of the vehicle information processing system 100 according to the third mode of embodiment. FIG. 18 is a flowchart of the operation of the vehicle information processing system 100 according to the third mode of embodiment. As shown in this figure and in the vehicle information processing system 100, the vehicle information acquirer 51 of the preceding vehicle 200 acquires a current position, a vehicular speed, winker state information 220, traffic lane information of/on the preceding vehicle 200, and traffic light information, and these information are transmitted by the transmitter-receiver 10 (ST30). Next, the transmitter-receiver 10 of the succeeding vehicle 201 receives the transmitted current position, vehicular speed, winker state information 220, traffic lane information, and traffic light information (ST31).

Figure 19:
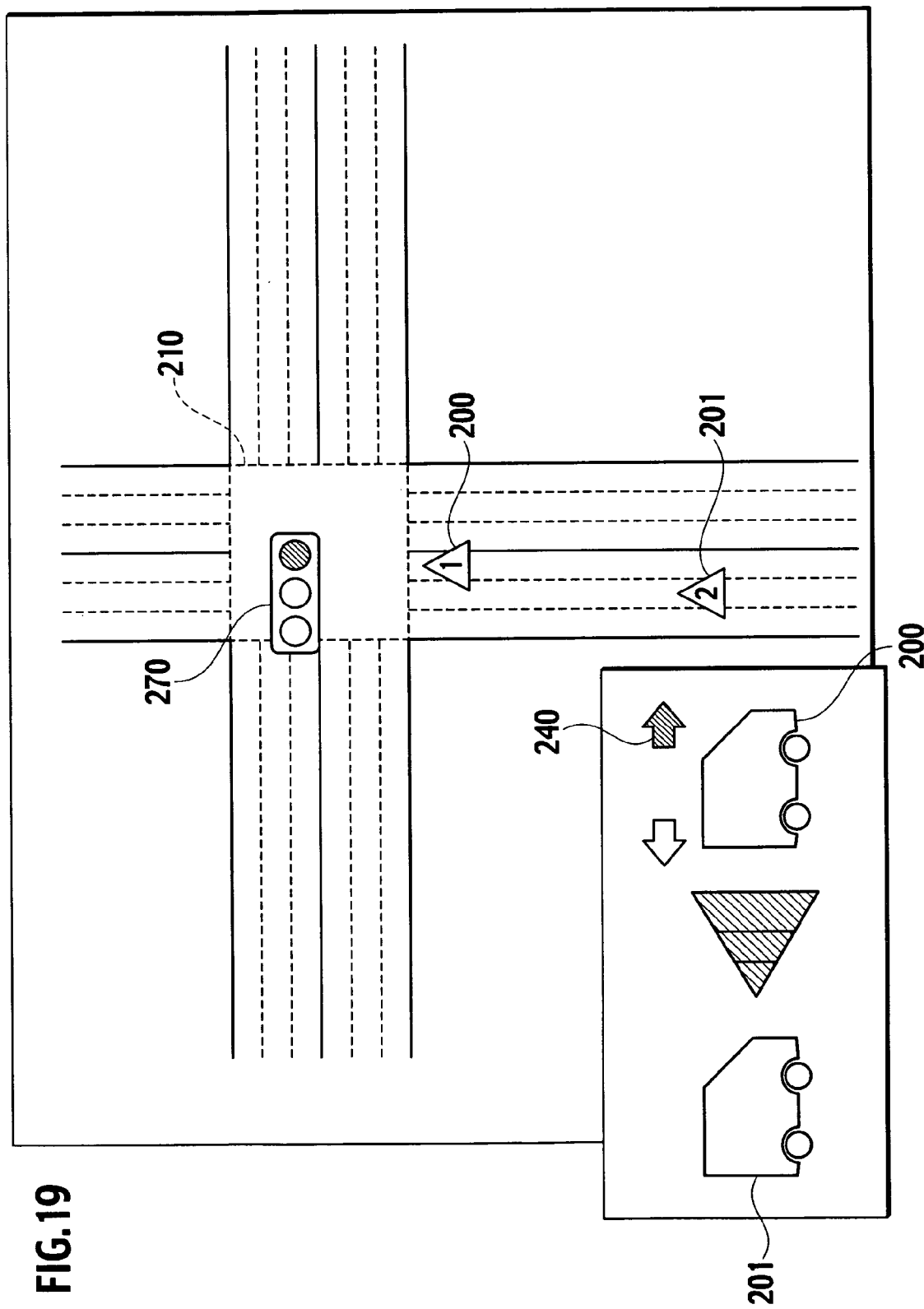
FIG. 19 is an explanatory view of an exemplary exhibition of information at step ST32 of FIG. 18.

Then, the display 30 of the succeeding vehicle 201 exhibits information on the preceding vehicle 200 (ST32). FIG. 19 is a view of an exemplary exhibition of information at step ST32 of FIG. 18. As shown in FIG. 19, when the preceding vehicle 200 is about to make a right turn at an intersection 210, the display 30 of the succeeding vehicle 201 exhibits a winker 240 itself of the preceding vehicle 200 together with running status information (current position and the like) of the preceding vehicle 200. The display 30 may exhibit traffic light information 270 on the preceding vehicle 200.

Referring again to FIG. 18, after exhibition of the information on the preceding vehicle 200, the vehicle information acquirer 51 of the succeeding vehicle 201 acquires information on a traffic light which the succeeding vehicle is approaching next (ST33). Then, the vehicle information connector 50 judges whether or not the state of the traffic light to be next passed by the succeeding vehicle 201 when the succeeding vehicle 201 is about to approach the traffic light, is different from the state of the traffic light when the preceding vehicle 200 approached it (ST34).

When judging that the states are different (ST34:YES), the vehicle information corrector 50 further judges whether or not the state of the traffic light which the succeeding vehicle 201 is approaching next, is green (ST35). When the vehicle information corrector 50 has judged that the state of the traffic light which the succeeding vehicle 201 is approaching next, is green (ST35: YES), the vehicle information corrector 50 judges that the exhibition timing of the winker state information 220 is to be hastened (ST36). Contrary, when the vehicle information corrector 50 has judged that the state of the traffic light which the succeeding vehicle 201 is approaching next, is not green (ST35: NO), the vehicle information corrector 50 judges that the exhibition timing of the winker state information 220 is to be delayed (ST37).

Then, the display 30 exhibits the winker state information 220 at the judged exhibition timing (ST38). Thereafter, the procedures at steps ST30 through ST43 are completed, and repeated until the electric-power source of the vehicle-mounted apparatus 3 is turned off.

Figure 20:
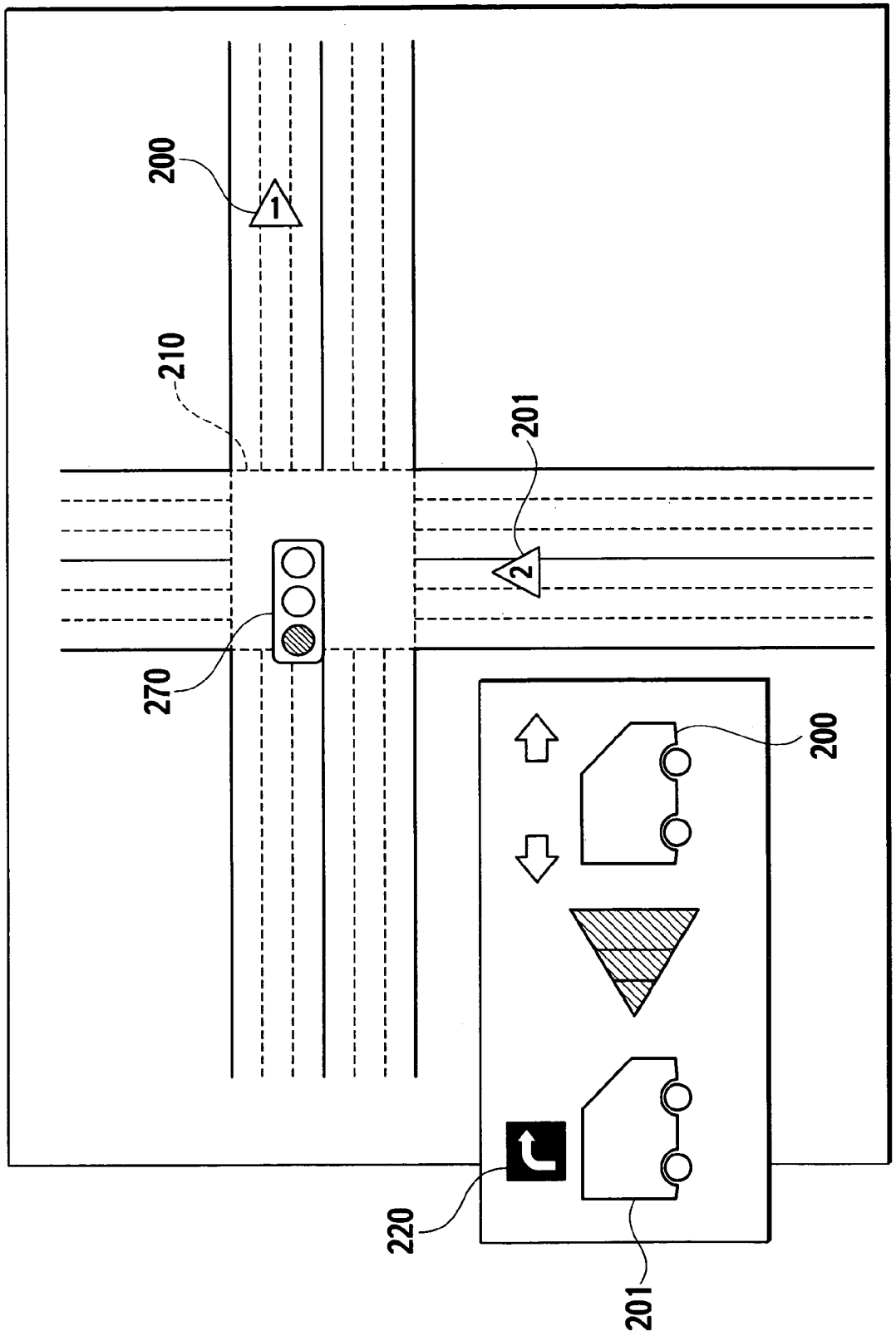
FIG. 20 is a state view of exhibition of winker state information 220 in the third mode of embodiment.

FIG. 20 is a state view of exhibition of winker state information 220 in the third mode of embodiment. As shown in this figure, the display 30 displays the winker state information 220 for encouraging a right turn. At this time, the exhibition timing has been decided based on the traffic light state as explained with reference to the flowchart of FIG. 18, so that the winker state information 220 is displayed at a suitable timing. In this way, the winker state information 220 is displayed at the suitable timing, thereby allowing a frequency of failure of follow-up running to be further decreased.

Note that, in case of judgment "NO" at step ST34, the procedures at steps ST39 through ST43 are execute. Since these procedures are the same as those at steps ST23 through ST27 shown in FIG. 13, the explanation thereof is omitted.

In this way, according to the vehicle information processing system 100 of the third mode of embodiment, there can be decreased a frequency of failure of group run (effects of claims 1 and 2), there can be avoided degradation of an accuracy of the winker state information 220 due to estimation (effects of claims 3 and 4), there can be conducted transmission and receipt of information directly between the vehicles without through an information center (effect of claim 5), there can be decreased a frequency of failure of follow-up running (effect of claim 6), there can be further decreased a frequency of failure of follow-up running (effects of claims 9, 10, 11, 12 through 14, and 16), and there can be decreased a processing burden (effect of claims 7 and 8), identically to the second mode of embodiment.

Further, according to the vehicle information processing system 100 of the third mode of embodiment, it is judged that the exhibition timing of winker state information 220 is to be hastened, in case that a traffic light to be next passed by the succeeding vehicle 201 has been turned into green when the succeeding vehicle 201 is about to approach the traffic light though the traffic light was red when the preceding vehicle 200 approached it. Contrary, it is judged that the exhibition timing of winker state information 220 is to be delayed, in case that a traffic light to be next passed by the succeeding vehicle 201 has been turned into red when the succeeding vehicle 201 is about to approach the traffic light though the traffic light was green when the preceding vehicle 200 approached it. In case that the traffic light was red when the preceding vehicle 200 approached it, the preceding vehicle 200 should have decreased its speed. Contrary, in case that the traffic light is green when the succeeding vehicle 201 is about to approach it, the succeeding vehicle 201 need not to decrease its speed even in view of the indication of the traffic light. As such, it is impossible for the succeeding vehicle 201 to cruise in the same manner as the preceding vehicle 200 to thereby cause a possibility of failure of follow-up running, unless deceleration is conducted by early exhibiting the winker state information 220. Thus, the vehicle information processing system 100 according to the third mode of embodiment decides an exhibition timing of winker state information 220 based on a state of a traffic light, thereby allowing the succeeding vehicle 201 to cruise in the same manner as the preceding vehicle 200 even when traffic light states for the vehicles are different from each other, to thereby moderate failure of follow-up running. This allows a frequency of failure of follow-up running to be further decreased (effect of claim 17).

Fourth Mode of Embodiment

There will be explained a fourth mode of embodiment of the present invention. Also the fourth mode of embodiment provides a vehicle information processing system 100 which is the same as that according to the third mode of embodiment, except that the former is partially different from the latter in vehicle-mounted apparatus configuration and processing details.

Figure 21:
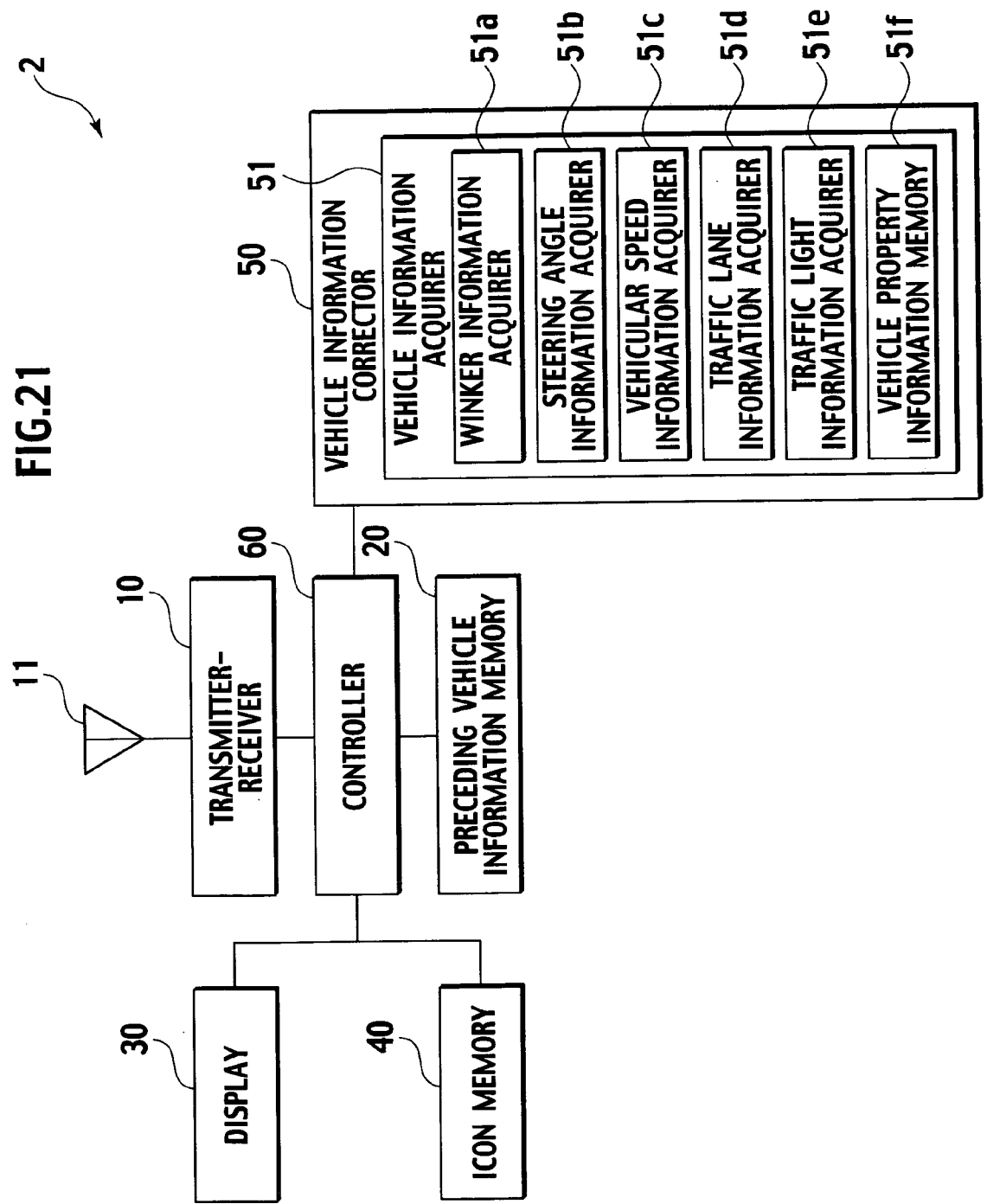
FIG. 21 is a constitutional view of a vehicle-mounted apparatus 4 according to a fourth mode of embodiment.

There will be explained points of this mode of embodiment different from the third mode of embodiment. FIG. 21 is a constitutional view of a vehicle-mounted apparatus 4 according to the fourth mode of embodiment. As shown in this figure, the vehicle-mounted apparatus 4 according to the fourth mode of embodiment newly includes a vehicle property information memory 51f including information stored therein on vehicle dimensions (such as overall width and overall height), vehicle performance (minimum turning radius), and the like.

Since the vehicle information corrector 50 according to the fourth mode of embodiment includes the vehicle property information memory 51f, it judges that the exhibition timing of information 220 is to be hastened when the succeeding vehicle 201 has a minimum turning radius larger than a minimum turning radius of the preceding vehicle 200, and judges that the exhibition liming of the winker state information 220 is to be delayed when the succeeding vehicle 201 has a minimum turning radius equal to or less than a minimum turning radius of the preceding vehicle 200.

FIG. 22 is a schematic view of an operation of the vehicle information processing system 100 according to the fourth mode of embodiment. As shown in this figure, it is supposed that the preceding vehicle 200 is about to make a right turn at an intersection into a narrow street. Here, the succeeding vehicle 201 will require a distance more than that required by the preceding vehicle 200 in making a right turn, when the minimum turning radius of the succeeding vehicle 201 is larger than the minimum turning radius of the preceding vehicle 200. As such, when the succeeding vehicle 201 is larger in minimum turning radius, the succeeding vehicle 201 may fail to make a turn into the narrow street. Thus, the vehicle information corrector 50 judges that the exhibition timing of winker state information 220 is to be hastened.

On the other hand, when the minimum turning radius of the succeeding vehicle 201 is equal to or less than the minimum turning radius of the preceding vehicle 200, the succeeding vehicle 201 requires only a distance equal to or shorter than that required by the preceding vehicle 200, in terms of a right turn. As such, the succeeding vehicle 201 has a slight leeway in terms of a right turn, so that the vehicle information corrector 50 judges that the exhibition timing of the winker state information 220 is to be delayed. Namely, the vehicle information processing system 100 according to the fourth mode of embodiment conducts a suitable exhibition of the winker state information 220, by conducting the above-described judgment.

In this way, according to the vehicle information processing system 100 of the fourth mode of embodiment, there can be decreased a frequency of failure of group run (effects of claims 1 and 2), there can be avoided degradation of an accuracy of the winker state information 220 due to estimation (effects of claims 3 and 4), there can be conducted transmission and receipt of information directly between the vehicles without through an information center (effect of claim 5), there can be decreased a frequency of failure of follow-up running (effect of claim 6), there can be further decrease a frequency of failure of follow-up running (effects of claims 9, 10, 11, 12 through 14, 16, and 17), and there can be decreased a processing burden (effect of claims 7 and 8), identically to the third mode of embodiment.

Further, according to the vehicle information processing system 100 of the fourth mode of embodiment, it is judged that the exhibition timing is to be hastened when the minimum turning radius of the succeeding vehicle 201 is larger than the minimum turning radius of the preceding vehicle 200, and that the exhibition timing is to be delayed when the minimum turning radius of the succeeding vehicle 201 is equal to or less than the minimum turning radius of the preceding vehicle 200. Here, the succeeding vehicle 201 will require a distance more than that required by the preceding vehicle 200 in making a right or left turn, when the minimum turning radius of the succeeding vehicle 201 is larger than the minimum turning radius of the preceding vehicle 200. As such, it is judged that the exhibition timing of the winker state information 220 is to be hastened when the succeeding vehicle 201 is larger in minimum turning radius. On the other hand, when the minimum turning radius of the succeeding vehicle 201 is equal to or less than the minimum turning radius of the preceding vehicle 200, the succeeding vehicle 201 requires only a distance equal to or shorter than that required by the preceding vehicle 200, in terms of a right or left turn. As such, the succeeding vehicle 201 has a slight leeway in terms of a right or left turn, so that the exhibition timing of the information 220 is judged to be delayed. Based on the above, the exhibition timing of the winker state information 220 is made appropriate by the above-described judgment, thereby allowing a frequency of failure of follow-up running to be further decreased (effect of claim 18).

Fifth Mode of Embodiment

There will be explained a fifth mode of embodiment of the present invention. Also the fifth mode of embodiment provides a vehicle information processing system 100 which is the same as that according to the first mode of embodiment, except that the former is partially different from the latter in vehicle-mounted apparatus configuration and processing details.

There will be explained points of this mode of embodiment different from the first mode of embodiment. FIG. 23 is a constitutional view of a vehicle-mounted apparatus 5 according to the fifth mode of embodiment. As shown in this figure, the vehicle-mounted apparatus 5 according to the fifth mode of embodiment newly includes an algorithm change decider 70. The algorithm change decider 70 judges whether own vehicle is a preceding vehicle 200 or a succeeding vehicle 201, and changes a display content or changes information to be transmitted/received.

Further, the algorithm change decider 70 has a preceding vehicle algorithm memory 71 and a succeeding vehicle algorithm memory 72. The preceding vehicle algorithm memory 71 stores therein a process algorithm to be executed when own vehicle is the preceding vehicle 200. The succeeding vehicle algorithm memory 72 stores therein a process algorithm to be executed when own vehicle is the succeeding vehicle 201.

FIG. 24 is an explanatory view of an operation of the vehicle information processing system 100 according to the fifth mode of embodiment. In case that own vehicle is the preceding vehicle 200, the algorithm change decider 70 judges that own vehicle is the preceding vehicle 200, so that it reads and executes the process algorithm for the preceding vehicle 200 from the preceding vehicle algorithm memory 71. The execution content is the same as that in the first mode of embodiment.

Further, the display 30 displays a presentation as shown in FIG. 24, in executing the process algorithm for the preceding vehicle 200. Namely, as shown in this figure, the display 30 displays an icon of the preceding vehicle 200 in a thick line so as to indicate that own vehicle is the preceding vehicle 200.

On the other hand, in case that own vehicle is the succeeding vehicle 201, the algorithm change decider 70 judges that own vehicle is the succeeding vehicle 201, so that it reads and executes the process algorithm for the succeeding vehicle 201 from the succeeding vehicle algorithm memory 72. The execution content is the same as that in the first mode of embodiment.

Further, in executing the process algorithm for the succeeding vehicle 201, the display 30 displays an icon of the succeeding vehicle 201 in a thick line, unlike the presentation example shown in FIG. 24.

Further, in the fifth mode of embodiment, the display 30 displays, between icons of the preceding vehicle 200 and succeeding vehicle 201, information 230 representing a distance between these vehicles. Concretely, the display 30 according to the fifth mode of embodiment displays the distance between the preceding vehicle 200 and succeeding vehicle 201 in a three-step manner. When the succeeding vehicle 201 is located near the preceding vehicle 200 (the distance being less than 80 meters, for example), the display 30 turns on a first arrowed part 230a only. When the succeeding vehicle 201 is slightly separated from the preceding vehicle 200 (the distance being from 80 meters to 120 meters, for example), the display 30 turns on the first arrowed part 230a and a second arrowed part 230b.

Moreover, when the succeeding vehicle 201 is separated from the preceding vehicle 200 such that the former is incapable of following the latter (the distance being more than 120 meters, for example), the display 30 turns on all the first through third arrowed parts 230a, 230b, and 230c. This allows a driver of the preceding vehicle 200 to adjust a speed thereof, or to stop and wait the succeeding vehicle 201, for example.

In this way, according to the vehicle information processing system 100 of the fifth mode of embodiment, there can be decreased a frequency of failure of group run (effects of claims 1 and 2), there can be avoided degradation of an accuracy of the winker state information 220 due to estimation (effects of claims 3 and 4), there can be conducted transmission and receipt of information directly between the vehicles without through an information center (effect of claim 5), there can be decreased a frequency of failure of follow-up running (effect of claim 6), there can be further decreased a frequency of failure of follow-up running (effects of claims 9, 10, 11, and 12 through 14), and there can be decreased a processing burden (effect of claims 7 and 8), identically to the first mode of embodiment.

Further, according to the vehicle information processing system 100 of the fifth mode of embodiment, it is judged whether own vehicle is a preceding vehicle 200 or succeeding vehicle 201, in a manner that the process algorithm for the preceding vehicle 200 is executed when own vehicle is the preceding vehicle 200, and that the process algorithm for the succeeding vehicle 201 is executed when own vehicle is the succeeding vehicle 201. This allows for realization of the vehicle information processing system 100 moderated in failure of follow-up running, in both cases that own vehicle makes a group run as a preceding vehicle 200 and that own vehicle makes a group run as a succeeding vehicle 201 (effect according to the fifth mode of embodiment).

According to the embodiments described, a running-related relationship between a first vehicle and a second vehicle is estimated, and an exhibition timing at which information on a winker state of the first vehicle is exhibited to a driver of the second vehicle, is decided depending on a result of the estimation. A winker state information on the first vehicle can be exhibited at a suitable timing in the second vehicle. This decreases a possibility of failure of group run due to an inappropriate exhibition timing of the winker state information, with a resultant decrease in frequency of failure in group run.

The present application claims a priority of Japanese Patent Application No. 2005-021693, filed to the Japanese Patent Office on Jan. 28, 2005, and the contents of the patent application are incorporated herein by reference.

Although preferred modes of embodiment of the present invention have been exemplified in the above, it will be apparent to those skilled in the art that other modes of embodiment and modifications are variously conceivable within the spirit or scope of the appended claims.

For example, the vehicle information acquirer 51 of the preceding vehicle 200 acquires information on a shape of a road which the preceding vehicle 200 has cruised down, as running status information on the preceding vehicle 200. Then, it is possible for the vehicle information corrector 50 of the succeeding vehicle 201 to judge a necessity of deceleration depending on the shape of the road, in a manner to judge that an exhibition timing of winker state information is to be hastened as the judged necessity of deceleration is increased, and to judge that the exhibition timing of the winker state information is to be delayed as the judged necessity of deceleration is lowered.

Meanwhile, it is impossible for a vehicle to make a right or left turn at a crossroads when the vehicle is cruising at a high-speed, unless the turn is conducted after sufficiently lowering the vehicular speed at the crossroads. As such, in case that a succeeding vehicle 201 has approached a crossroads without sufficiently lowering its vehicular speed after a preceding vehicle 200 made a right or left turn at the crossroads, it is inevitable for a driver of the succeeding vehicle 201 to straightly advance through the crossroads, thereby causing a possibility of failure of follow-up running. Therefore, the vehicle information processing system 100 hastens an exhibition timing of winker state information 220 as the necessity of deceleration is increased such as at a crossroads, thereby encouraging deceleration.

Contrary, it is possible for a vehicle to completely make a turn at a Y-shaped intersection, without conducting substantial deceleration. Therefore, the vehicle information processing system 100 delays an exhibition timing of winker state information 220 as a necessity of deceleration is lowered such as at a Y-shaped intersection.

In this way, it is also possible to further decrease a frequency of failure of follow-up running, by changing an exhibition tiring of winker state information 220 depending on a road shape (effect of claim 11).

What is claimed is:

1. A vehicle information processing system configured to process information on a vehicle, comprising:
    an estimator configured to estimator running-related relationship between a first vehicle and a second vehicle; and
    a timing decider configured to decide, depending on a result of an estimation by the estimator, an exhibition timing at which information on a winker state of the first vehicle is exhibited to a driver of the second vehicle.

2. The vehicle information processing system as claimed in claim 1, further comprising an information acquirer configured to acquire information on a winker state of the first vehicle.

3. The vehicle information processing system as claimed in claim 2, further comprising a transmitter configured to transmit the information on the winker state of the first vehicle,
    wherein the first vehicle includes, mounted thereon, the information acquirer and the transmitter.

4. The vehicle information processing system as claimed in claim 1, further comprising a receiver configured to receive the information on the winker state of the first vehicle,
    wherein the second vehicle, mounted thereon, the receiver and the timing decider.

5. The vehicle information processing system as claimed in claim 1, wherein the first vehicle includes, mounted thereon: an information acquirer configured to acquire information on a winker state of the first vehicle; and a transmitter configured to transmit the information on the winker state of the first vehicle to the second vehicle, and wherein the second vehicle includes, mounted thereon: a receiver configured to receive the information on the winker state of the first vehicle; the estimator; and the timing decider.

6. The vehicle information processing system as claimed in claim 5, wherein the second vehicle is a vehicle configured to run by following the first vehicle.

7. The vehicle information processing system as claimed in claim 6, wherein the timing decider is configured to decide the exhibition timing of the information on the winker state, in case of prediction that follow-up running of the second vehicle will be disordered.

8. The vehicle information processing system as claimed in claim 7, wherein the case of prediction that follow-up running of the second vehicle will be disordered, is at least one of cases that the first vehicle has made a right or left turn, that the first vehicle has changed a traffic lane, and that the first vehicle is about to pass through a toll gate of a toll road.

9. The vehicle information processing system as claimed in claim 6, wherein the information acquirer is configured to acquire information on a running status of the first vehicle, in addition to the information on the winker state, wherein the transmitter is configured to transmit the information on the running status of the first vehicle, wherein the receiver is configured to receive the information on the running status of the first vehicle, from the transmitter, and wherein the timing decider is configured to decide an exhibition timing of the information on the winker state, based on the received information on the running status of the first vehicle.

10. The vehicle information processing system as claimed in claim 9, wherein the information acquirer is configured to acquire, as the information on the running status of the first vehicle, a distance from the first vehicle to an intersection at the time when a winker of the first vehicle was operated, and wherein the timing decider is configured to judge that the exhibition timing of the information on the winker state is to be hastened as the distance is longer, and to judge that the exhibition timing of the information on the winker state is to be delayed as the distance is shorter.

11. The vehicle information processing system as claimed in claim 9, wherein the information acquirer is configured to acquire, as the information on the running status of the first vehicle, information on a shape of a road which the first vehicle has cruised down, and wherein the timing decider is configured to judge a necessity of deceleration depending on the shape of the road, in a manner to judge that the exhibition timing of the information on the winker state is to be hastened as the judged necessity of deceleration is increased, and to judge that the exhibition timing of the information on the winker state is to be delayed as the judged necessity of deceleration is lowered.

12. The vehicle information processing system as claimed in claim 9, further comprising a second information acquirer mounted on the second vehicle and configured to acquire information on a running status of the second vehicle, and wherein the timing decider is configured to decide the exhibition timing of the information on the winker state, based on both the information on the running status of the first vehicle and the information on the running status of the second vehicle.

13. The vehicle information processing system as claimed in claim 12, wherein the information acquirer and the second information acquirer are each configured to acquire vehicular speed information as the running status information, and wherein the timing decider is configured to judge: that the exhibition timing of the information on the winker state is to be hastened, when a current vehicular speed of the second vehicle exceeds a vehicular speed of the first vehicle at a current location of the second vehicle; and that the exhibition timing of the information on the winker state is to be delayed, when the current vehicular speed of the second vehicle is equal to or less than the vehicular speed of the first vehicle at the current location of the second vehicle.

14. The vehicle information processing system as claimed in claim 13, further comprising an exhibiter configured to exhibit the information on the winker state of the first vehicle at the exhibition timing decided by the timing decider, and wherein the exhibiter is mounted on the second vehicle.

15. The vehicle information processing system as claimed in claim 14, wherein the exhibiter exhibits at least one of information to brake, and information to shift down in advance of the information on the winker state, when the vehicular speed of the second vehicle exceeds the vehicular speed of the first vehicle at the current location of the second vehicle.

16. The vehicle information processing system as claimed in claim 12, wherein the information acquirer and the second information acquirer are each configured to acquire information on a cruising lane as the running status information, and wherein the timing decider is configured to judge that the exhibition timing of the information on the winker state is to be hastened when a cruising lane the first vehicle has cruised down is different from a current cruising lane of the second vehicle, at a current location of the second vehicle.

17. The vehicle information processing system as claimed in claim 12, wherein the information acquirer and the second information acquirer are each configured to acquire information on a state of a traffic light to be passed by the vehicle, and wherein the ting decider is configured to judge: that the exhibition timing of the information on the winker state is to be hastened, in case that a traffic light to be next passed by the second vehicle has been turned into green when the second vehicle is about to approach the traffic light though the traffic light was red when the first vehicle approached it; and that the exhibition timing of the information on the winker state is to be delayed, in case that a traffic light to be next passed by the second vehicle has been turned into red when the second vehicle is about to approach the traffic light though the traffic light was green when the first vehicle approached it.

18. The vehicle information processing system as claimed in claim 12, wherein the information acquirer and the second information acquirer are each configured to acquire a minimum timing radius of the vehicle as the running status information, and wherein the timing decider is configured to judge: that the exhibition timing of the information on the winker state is to be hastened, in case that the second vehicle has a minimum turning radius larger than a minimum turning radius of the first vehicle; and that the exhibition timing of the information on the winker state is to be delayed, in case that the second vehicle has a minimum turning radius equal to or less than a minimum timing radius of the first vehicle.

19. A vehicle information processing system configured to process information on a vehicle, comprising:
estimation means for estimating a running-related relationship between a first vehicle and a second vehicle; and
timing decision means for deciding an exhibition timing of information on a winker state of the first vehicle, depending on a result of an estimation by the estimation means.

20. A vehicle information processing method of processing information on a vehicle, comprising:
estimating a running-related relationship between a first vehicle and a second vehicle; and
deciding an exhibition timing of information on a winker state of the first vehicle, depending on an estimation result.

* * * * *